United States Patent
Moore et al.

(10) Patent No.: US 12,527,956 B2
(45) Date of Patent: Jan. 20, 2026

(54) METHODS AND SYSTEMS FOR MONITORING OR ASSESSING MOVEMENT DISORDERS OR OTHER PHYSIOLOGICAL PARAMETERS USING A STIMULATION SYSTEM

(71) Applicant: Boston Scientific Neuromodulation Corporation, Valencia, CA (US)

(72) Inventors: Lisa Denise Moore, Glendale, CA (US); Andrew James Haddock, Los Angeles, CA (US); Adarsh Jayakumar, Valencia, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 467 days.

(21) Appl. No.: 18/075,868

(22) Filed: Dec. 6, 2022

(65) Prior Publication Data

US 2023/0181906 A1 Jun. 15, 2023

Related U.S. Application Data

(60) Provisional application No. 63/287,775, filed on Dec. 9, 2021.

(51) Int. Cl.
*A61N 1/36* (2006.01)
*A61N 1/02* (2006.01)

(52) U.S. Cl.
CPC ......... *A61N 1/36132* (2013.01); *A61N 1/025* (2013.01); *A61N 1/36139* (2013.01)

(58) Field of Classification Search
CPC .................. A61N 1/37217; A61N 1/36132
See application file for complete search history.

(56) References Cited

U.S. PATENT DOCUMENTS

| | | |
|---|---|---|
| 3,999,555 A | 12/1976 | Person |
| 4,144,889 A | 3/1979 | Tyers et al. |

(Continued)

FOREIGN PATENT DOCUMENTS

| | | |
|---|---|---|
| EP | 0813889 | 12/1997 |
| EP | 1048320 | 11/2000 |

(Continued)

OTHER PUBLICATIONS

Mcintyre, Cameron, et al., "Finite element analysis of the current-density and electric field generated by metal microelectrodes", Ann Biomed Eng. 29(3), (2001),227-235.

(Continued)

*Primary Examiner* — Alyssa M Alter
(74) *Attorney, Agent, or Firm* — Branch Partners PLLC; Bruce E. Black

(57) ABSTRACT

Electrical stimulation systems and methods for operation of the electrical stimulation system are described. The method includes directing electrical stimulation through the electrodes of the lead and monitoring movements of a hand positioned over an implantation site of an implantable control module of the electrical stimulation system using an accelerometer coupled to a processor of the implantable control module. Another method includes detecting, by a sensor, a plurality of taps of a body region of a patient over an implantation site of the implantable control module, identifying, by the processor of the implantable control module, an indicator, trigger, or marker based on the detected tapping, and performing an activity corresponding to the identified indicator, trigger, or marker.

20 Claims, 4 Drawing Sheets

(56) References Cited

U.S. PATENT DOCUMENTS

| | | | |
|---|---|---|---|
| 4,177,818 A | 12/1979 | De Pedro | |
| 4,341,221 A | 7/1982 | Testerman | |
| 4,378,797 A | 4/1983 | Osterholm | |
| 4,445,500 A | 5/1984 | Osterholm | |
| 4,625,730 A | 12/1986 | Fountain et al. | |
| 4,735,208 A | 4/1988 | Wyler et al. | |
| 4,765,341 A | 8/1988 | Mower et al. | |
| 4,841,973 A | 6/1989 | Stecker | |
| 5,067,495 A | 11/1991 | Brehm | |
| 5,099,846 A | 3/1992 | Hardy | |
| 5,222,494 A | 6/1993 | Baker, Jr. | |
| 5,255,693 A | 10/1993 | Dutcher | |
| 5,259,387 A | 11/1993 | dePinto | |
| 5,304,206 A * | 4/1994 | Baker, Jr. | A61N 1/37217 607/45 |
| 5,344,438 A | 9/1994 | Testerman et al. | |
| 5,361,763 A | 11/1994 | Kao et al. | |
| 5,452,407 A | 9/1995 | Crook | |
| 5,560,360 A | 10/1996 | Filler et al. | |
| 5,565,949 A | 10/1996 | Kasha, Jr. | |
| 5,593,427 A | 1/1997 | Gliner et al. | |
| 5,601,612 A | 2/1997 | Gliner et al. | |
| 5,607,454 A | 3/1997 | Cameron et al. | |
| 5,620,470 A | 4/1997 | Gliner et al. | |
| 5,651,767 A | 7/1997 | Schulman | |
| 5,697,958 A | 12/1997 | Paul et al. | |
| 5,702,429 A | 12/1997 | King | |
| 5,711,316 A | 1/1998 | Elsberry et al. | |
| 5,713,922 A | 2/1998 | King | |
| 5,716,377 A | 2/1998 | Rise et al. | |
| 5,724,985 A | 3/1998 | Snell et al. | |
| 5,749,904 A | 5/1998 | Gliner et al. | |
| 5,749,905 A | 5/1998 | Gliner et al. | |
| 5,776,170 A | 7/1998 | MacDonald et al. | |
| 5,782,762 A | 7/1998 | Vining | |
| 5,792,204 A | 8/1998 | Snell | |
| 5,792,205 A | 8/1998 | Alt et al. | |
| 5,843,148 A | 12/1998 | Gijsbers et al. | |
| 5,859,922 A | 1/1999 | Hoffmann | |
| 5,868,740 A | 2/1999 | LeVeen et al. | |
| 5,897,583 A | 4/1999 | Meyer et al. | |
| 5,902,236 A | 5/1999 | Iverson | |
| 5,902,249 A | 5/1999 | Lyster | |
| 5,910,804 A | 6/1999 | Fortenbery et al. | |
| 5,913,882 A | 6/1999 | King | |
| 5,925,070 A | 7/1999 | King et al. | |
| 5,938,688 A | 8/1999 | Schiff | |
| 5,938,690 A | 8/1999 | Law et al. | |
| 5,978,713 A | 11/1999 | Prutchi et al. | |
| 6,016,449 A | 1/2000 | Fischell et al. | |
| 6,029,090 A | 2/2000 | Herbst | |
| 6,029,091 A | 2/2000 | de la Rama et al. | |
| 6,050,992 A | 4/2000 | Nichols | |
| 6,058,331 A | 5/2000 | King | |
| 6,061,593 A | 5/2000 | Fischell et al. | |
| 6,066,163 A | 5/2000 | John | |
| 6,080,187 A | 6/2000 | Alt et al. | |
| 6,083,162 A | 7/2000 | Vining | |
| 6,094,598 A | 7/2000 | Elsberry et al. | |
| 6,096,756 A | 8/2000 | Crain et al. | |
| 6,106,460 A | 8/2000 | Panescu et al. | |
| 6,109,269 A | 8/2000 | Rise et al. | |
| 6,128,538 A | 10/2000 | Fischell et al. | |
| 6,129,685 A | 10/2000 | Howard, III | |
| 6,146,390 A | 11/2000 | Heilbrun et al. | |
| 6,161,044 A | 12/2000 | Silverstone | |
| 6,167,311 A | 12/2000 | Rezai | |
| 6,181,969 B1 | 1/2001 | Gord | |
| 6,192,266 B1 | 2/2001 | Dupree et al. | |
| 6,205,361 B1 | 3/2001 | Kuzma | |
| 6,208,881 B1 | 3/2001 | Champeau | |
| 6,240,308 B1 | 5/2001 | Hardy et al. | |
| 6,246,912 B1 | 6/2001 | Sluijter et al. | |
| 6,253,109 B1 | 6/2001 | Gielen | |
| 6,289,239 B1 | 9/2001 | Panescu et al. | |
| 6,295,944 B1 | 10/2001 | Lovett | |
| 6,301,492 B1 | 10/2001 | Zonenshayn | |
| 6,310,619 B1 | 10/2001 | Rice | |
| 6,319,241 B1 | 11/2001 | King | |
| 6,336,899 B1 | 1/2002 | Yamazaki | |
| 6,343,226 B1 | 1/2002 | Sunde et al. | |
| 6,351,675 B1 | 2/2002 | Tholen et al. | |
| 6,353,762 B1 | 3/2002 | Baudino et al. | |
| 6,366,813 B1 | 4/2002 | Dilorenzo | |
| 6,368,331 B1 | 4/2002 | Front et al. | |
| 6,389,311 B1 | 5/2002 | Whayne et al. | |
| 6,391,985 B1 | 5/2002 | Goode et al. | |
| 6,393,325 B1 | 5/2002 | Mann et al. | |
| 6,421,566 B1 | 7/2002 | Holsheimer | |
| 6,435,878 B1 | 8/2002 | Reynolds et al. | |
| 6,442,432 B2 | 8/2002 | Lee | |
| 6,463,328 B1 | 10/2002 | John | |
| 6,491,699 B1 | 12/2002 | Henderson et al. | |
| 6,494,831 B1 | 12/2002 | Koritzinsky | |
| 6,507,759 B1 | 1/2003 | Prutchi et al. | |
| 6,510,347 B2 | 1/2003 | Borkan | |
| 6,516,227 B1 | 2/2003 | Meadows et al. | |
| 6,517,480 B1 | 2/2003 | Krass | |
| 6,539,263 B1 | 3/2003 | Schiff | |
| 6,560,490 B2 | 5/2003 | Grill et al. | |
| 6,579,280 B1 | 6/2003 | Kovach et al. | |
| 6,600,956 B2 | 7/2003 | Maschino et al. | |
| 6,606,523 B1 | 8/2003 | Jenkins | |
| 6,609,029 B1 | 8/2003 | Mann et al. | |
| 6,609,031 B1 | 8/2003 | Law et al. | |
| 6,609,032 B1 | 8/2003 | Woods et al. | |
| 6,622,048 B1 | 9/2003 | Mann et al. | |
| 6,631,297 B1 | 10/2003 | Mo | |
| 6,654,642 B2 | 11/2003 | North et al. | |
| 6,662,053 B2 | 12/2003 | Borkan | |
| 6,675,046 B2 | 1/2004 | Holsheimer | |
| 6,684,106 B2 | 1/2004 | Herbst | |
| 6,687,392 B1 | 2/2004 | Touzawa et al. | |
| 6,690,972 B2 | 2/2004 | Conley et al. | |
| 6,690,974 B2 | 2/2004 | Archer et al. | |
| 6,692,315 B1 | 2/2004 | Soumillion et al. | |
| 6,694,162 B2 | 2/2004 | Hartlep | |
| 6,694,163 B1 | 2/2004 | Vining | |
| 6,708,096 B1 | 3/2004 | Frei et al. | |
| 6,721,603 B2 | 4/2004 | Zabara et al. | |
| 6,741,892 B1 | 5/2004 | Meadows et al. | |
| 6,748,098 B1 | 6/2004 | Rosenfeld | |
| 6,748,276 B1 | 6/2004 | Daignault, Jr. et al. | |
| 6,778,846 B1 | 8/2004 | Martinez et al. | |
| 6,788,969 B2 | 9/2004 | Dupree et al. | |
| 6,795,737 B2 | 9/2004 | Gielen et al. | |
| 6,827,681 B2 | 12/2004 | Tanner et al. | |
| 6,830,544 B2 | 12/2004 | Tanner | |
| 6,845,267 B2 | 1/2005 | Harrison et al. | |
| 6,850,802 B2 | 2/2005 | Holsheimer | |
| 6,895,280 B2 | 5/2005 | Meadows et al. | |
| 6,909,913 B2 | 6/2005 | Vining | |
| 6,937,891 B2 | 8/2005 | Leinders et al. | |
| 6,937,903 B2 | 8/2005 | Schuler et al. | |
| 6,944,497 B2 | 9/2005 | Stypulkowski | |
| 6,944,501 B1 | 9/2005 | Pless | |
| 6,950,707 B2 | 9/2005 | Whitehurst | |
| 6,969,388 B2 | 11/2005 | Goldman et al. | |
| 7,003,349 B1 | 2/2006 | Andersson et al. | |
| 7,003,352 B1 | 2/2006 | Whitehurst | |
| 7,008,370 B2 | 3/2006 | Tanner et al. | |
| 7,008,413 B2 | 3/2006 | Kovach et al. | |
| 7,024,247 B2 | 4/2006 | Gliner et al. | |
| 7,035,690 B2 | 4/2006 | Goetz | |
| 7,043,293 B1 | 5/2006 | Baura | |
| 7,047,082 B1 | 5/2006 | Schrom et al. | |
| 7,047,084 B2 | 5/2006 | Erickson et al. | |
| 7,050,857 B2 | 5/2006 | Samuelsson et al. | |
| 7,054,692 B1 | 5/2006 | Whitehurst et al. | |
| 7,058,446 B2 | 6/2006 | Schuler et al. | |
| 7,082,333 B1 | 7/2006 | Bauhahn et al. | |
| 7,107,102 B2 | 9/2006 | Daignault et al. | |
| 7,126,000 B2 | 10/2006 | Ogawa et al. | |
| 7,127,297 B2 | 10/2006 | Law et al. | |

(56) References Cited

U.S. PATENT DOCUMENTS

| | | | |
|---|---|---|---|
| 7,136,518 | B2 | 11/2006 | Griffin et al. |
| 7,136,695 | B2 | 11/2006 | Pless et al. |
| 7,142,923 | B2 | 11/2006 | North et al. |
| 7,146,219 | B2 | 12/2006 | Sieracki et al. |
| 7,146,223 | B1 | 12/2006 | King |
| 7,151,961 | B1 | 12/2006 | Whitehurst |
| 7,155,279 | B2 | 12/2006 | Whitehurst |
| 7,167,760 | B2 | 1/2007 | Dawant et al. |
| 7,177,674 | B2 | 2/2007 | Echauz et al. |
| 7,181,286 | B2 | 2/2007 | Sieracki et al. |
| 7,184,837 | B2 | 2/2007 | Goetz |
| 7,191,014 | B2 | 3/2007 | Kobayashi et al. |
| 7,203,548 | B2 | 4/2007 | Whitehurst et al. |
| 7,209,787 | B2 | 4/2007 | DiLorenzo |
| 7,211,050 | B1 | 5/2007 | Caplygin |
| 7,216,000 | B2 | 5/2007 | Sieracki et al. |
| 7,217,276 | B2 | 5/2007 | Henderson |
| 7,218,968 | B2 | 5/2007 | Condie et al. |
| 7,228,179 | B2 | 6/2007 | Campen et al. |
| 7,231,254 | B2 | 6/2007 | DiLorenzo |
| 7,236,830 | B2 | 6/2007 | Gliner |
| 7,239,910 | B2 | 7/2007 | Tanner |
| 7,239,916 | B2 | 7/2007 | Thompson et al. |
| 7,239,926 | B2 | 7/2007 | Goetz |
| 7,242,984 | B2 | 7/2007 | DiLorenzo |
| 7,244,150 | B1 | 7/2007 | Brase et al. |
| 7,252,090 | B2 | 8/2007 | Goetz |
| 7,254,445 | B2 | 8/2007 | Law et al. |
| 7,254,446 | B1 | 8/2007 | Erickson |
| 7,257,447 | B2 | 8/2007 | Cates et al. |
| 7,266,412 | B2 | 9/2007 | Stypulkowski |
| 7,289,761 | B2 | 10/2007 | Mazar |
| 7,294,107 | B2 | 11/2007 | Simon et al. |
| 7,295,876 | B1 | 11/2007 | Erickson |
| 7,299,096 | B2 | 11/2007 | Balzer et al. |
| 7,308,302 | B1 | 12/2007 | Schuler et al. |
| 7,313,430 | B2 | 12/2007 | Urquhart |
| 7,319,962 | B2 | 1/2008 | Goedeke et al. |
| 7,324,851 | B1 | 1/2008 | DiLorenzo |
| 7,346,282 | B2 | 3/2008 | Sakanaka et al. |
| 7,346,382 | B2 | 3/2008 | McIntyre et al. |
| 7,385,443 | B1 | 6/2008 | Denison |
| 7,388,974 | B2 | 6/2008 | Yanagita |
| 7,424,322 | B2 | 9/2008 | Lombardi et al. |
| 7,437,193 | B2 | 10/2008 | Parramon et al. |
| 7,450,992 | B1 | 11/2008 | Cameron |
| 7,450,997 | B1 | 11/2008 | Pianca et al. |
| 7,454,245 | B2 | 11/2008 | Armstrong et al. |
| 7,463,928 | B2 | 12/2008 | Lee et al. |
| 7,499,048 | B2 | 3/2009 | Sieracki et al. |
| 7,505,815 | B2 | 3/2009 | Lee et al. |
| 7,548,786 | B2 | 6/2009 | Lee et al. |
| 7,565,199 | B2 | 7/2009 | Sheffield et al. |
| 7,596,414 | B2 | 9/2009 | Whitehurst et al. |
| 7,603,177 | B2 | 10/2009 | Sieracki et al. |
| 7,603,179 | B1 | 10/2009 | Grandhe |
| 7,610,103 | B2 | 10/2009 | Whitehurst et al. |
| 7,617,002 | B2 | 11/2009 | Goetz |
| 7,623,918 | B2 | 11/2009 | Goetz |
| 7,650,184 | B2 | 1/2010 | Walter |
| 7,657,319 | B2 | 2/2010 | Goetz et al. |
| 7,672,734 | B2 | 3/2010 | Anderson et al. |
| 7,676,273 | B2 | 3/2010 | Goetz et al. |
| 7,680,526 | B2 | 3/2010 | McIntyre et al. |
| 7,734,340 | B2 | 6/2010 | De Ridder |
| 7,761,165 | B1 | 7/2010 | He et al. |
| 7,783,359 | B2 | 8/2010 | Meadows |
| 7,792,590 | B1 | 9/2010 | Pianca et al. |
| 7,809,446 | B2 | 10/2010 | Meadows |
| 7,826,902 | B2 | 11/2010 | Stone et al. |
| 7,848,802 | B2 | 12/2010 | Goetz et al. |
| 7,860,548 | B2 | 12/2010 | McIntyre et al. |
| 7,896,808 | B1 | 3/2011 | Koh et al. |
| 7,904,134 | B2 | 3/2011 | McIntyre et al. |
| 7,945,105 | B1 | 5/2011 | Jaenisch |
| 7,949,395 | B2 | 5/2011 | Kuzma |
| 7,974,706 | B2 | 7/2011 | Moffitt et al. |
| 8,000,794 | B2 | 8/2011 | Lozano |
| 8,019,439 | B2 | 9/2011 | Kuzma et al. |
| 8,019,443 | B2 | 9/2011 | Schleicher et al. |
| 8,175,710 | B2 | 5/2012 | He |
| 8,180,601 | B2 | 5/2012 | Butson et al. |
| 8,187,209 | B1 | 5/2012 | Giuffrida |
| 8,195,300 | B2 | 6/2012 | Gliner et al. |
| 8,209,027 | B2 | 6/2012 | Butson et al. |
| 8,224,450 | B2 | 7/2012 | Brase |
| 8,255,057 | B2 | 8/2012 | Fang et al. |
| 8,257,684 | B2 | 9/2012 | Covalin et al. |
| 8,262,714 | B2 | 9/2012 | Hulvershorn et al. |
| 8,271,094 | B1 | 9/2012 | Moffitt et al. |
| 8,280,514 | B2 | 10/2012 | Lozano et al. |
| 8,295,944 | B2 | 10/2012 | Howard et al. |
| 8,306,627 | B2 | 11/2012 | Armstrong |
| 8,326,433 | B2 | 12/2012 | Blum et al. |
| 8,335,664 | B2 | 12/2012 | Eberle |
| 8,352,030 | B2 | 1/2013 | Denison |
| 8,359,107 | B2 | 1/2013 | Pianca et al. |
| 8,364,278 | B2 | 1/2013 | Pianca et al. |
| 8,369,954 | B2 | 2/2013 | Stack et al. |
| 8,379,952 | B2 | 2/2013 | McIntyre et al. |
| 8,391,985 | B2 | 3/2013 | McDonald |
| 8,412,349 | B2 | 4/2013 | Barker |
| 8,429,174 | B2 | 4/2013 | Ramani et al. |
| 8,452,415 | B2 | 5/2013 | Goetz et al. |
| 8,467,883 | B2 | 6/2013 | Chen et al. |
| 8,473,061 | B2 | 6/2013 | Moffitt et al. |
| 8,483,237 | B2 | 7/2013 | Zimmermann et al. |
| 8,543,189 | B2 | 9/2013 | Paitel et al. |
| 8,571,665 | B2 | 10/2013 | Moffitt et al. |
| 8,589,316 | B2 | 11/2013 | Lujan et al. |
| 8,594,800 | B2 | 11/2013 | Butson et al. |
| 8,594,801 | B2 | 11/2013 | Corndorf et al. |
| 8,606,360 | B2 | 12/2013 | Butson et al. |
| 8,606,362 | B2 | 12/2013 | He et al. |
| 8,620,436 | B2 | 12/2013 | Parramon et al. |
| 8,620,452 | B2 | 12/2013 | King et al. |
| 8,649,845 | B2 | 2/2014 | McIntyre et al. |
| 8,675,945 | B2 | 3/2014 | Barnhorst et al. |
| 8,679,038 | B1 | 3/2014 | Giuffrida |
| 8,688,235 | B1 | 4/2014 | Pianca et al. |
| 8,706,251 | B2 | 4/2014 | Von Arx et al. |
| 8,744,596 | B2 | 6/2014 | Howard |
| 8,751,008 | B2 | 6/2014 | Carlton et al. |
| 8,751,016 | B2 | 6/2014 | Schleicher et al. |
| 8,768,453 | B2 | 7/2014 | Parramon et al. |
| 8,774,941 | B2 | 7/2014 | Pianca |
| 8,792,993 | B2 | 7/2014 | Pianca et al. |
| 8,831,731 | B2 | 9/2014 | Blum et al. |
| 8,831,742 | B2 | 9/2014 | Pianca et al. |
| 8,845,557 | B1 | 9/2014 | Giuffrida et al. |
| 8,849,632 | B2 | 9/2014 | Sparks et al. |
| 8,855,773 | B2 | 10/2014 | Kokones et al. |
| 8,868,199 | B2 | 10/2014 | Kaula et al. |
| 8,913,804 | B2 | 12/2014 | Blum et al. |
| 8,918,183 | B2 | 12/2014 | Carlton et al. |
| 8,918,184 | B1 | 12/2014 | Torgerson et al. |
| 8,923,976 | B2 | 12/2014 | Johanek |
| 8,936,622 | B2 | 1/2015 | Wales et al. |
| 8,958,615 | B2 | 2/2015 | Blum et al. |
| 8,972,023 | B2 | 3/2015 | Bradley et al. |
| 8,986,382 | B2 | 3/2015 | Bentley et al. |
| 9,020,789 | B2 | 4/2015 | Butson et al. |
| 9,026,317 | B2 | 5/2015 | Furukawa et al. |
| 9,039,740 | B2 | 5/2015 | Wales et al. |
| 9,044,155 | B2 | 6/2015 | Strahl |
| 9,050,470 | B2 | 6/2015 | Carlton et al. |
| 9,061,138 | B2 | 6/2015 | Pianca |
| 9,061,140 | B2 | 6/2015 | Shi et al. |
| 9,072,905 | B2 | 7/2015 | Kokones et al. |
| 9,081,488 | B2 | 7/2015 | Soederstroem |
| 9,084,896 | B2 | 7/2015 | Kokones et al. |
| 9,113,801 | B2 | 8/2015 | DiLorenzo |
| 9,119,964 | B2 | 9/2015 | Marnfeldt |
| 9,135,400 | B2 | 9/2015 | McIntyre et al. |

(56) References Cited

U.S. PATENT DOCUMENTS

| | | |
|---|---|---|
| 9,149,630 B2 | 10/2015 | Howard et al. |
| 9,155,892 B2 | 10/2015 | Parker et al. |
| 9,162,056 B2 | 10/2015 | Pianca |
| 9,220,889 B2 | 12/2015 | Carlton et al. |
| 9,227,074 B2 | 1/2016 | Carcieri et al. |
| 9,235,685 B2 | 1/2016 | McIntyre et al. |
| 9,248,272 B2 | 2/2016 | Romero |
| 9,248,274 B2 | 2/2016 | Troosters et al. |
| 9,248,279 B2 | 2/2016 | Chen et al. |
| 9,248,296 B2 | 2/2016 | Carcieri et al. |
| 9,254,387 B2 | 2/2016 | Blum et al. |
| 9,265,431 B2 | 2/2016 | Hincapie Ordonez et al. |
| 9,272,153 B2 | 3/2016 | Blum et al. |
| 9,275,637 B1 | 3/2016 | Salvador et al. |
| 9,289,596 B2 | 3/2016 | Leven |
| 9,289,600 B2 | 3/2016 | Govea et al. |
| 9,302,110 B2 | 4/2016 | Kokones et al. |
| 9,302,112 B2 | 4/2016 | Bomzin et al. |
| 9,308,372 B2 | 4/2016 | Sparks et al. |
| 9,310,985 B2 | 4/2016 | Blum et al. |
| 9,327,111 B2 | 5/2016 | Pianca et al. |
| 9,358,398 B2 | 6/2016 | Moffitt et al. |
| 9,364,665 B2 | 6/2016 | Bokil et al. |
| 9,381,348 B2 | 7/2016 | Romero et al. |
| 9,381,356 B2 | 7/2016 | Parker et al. |
| 9,386,934 B2 | 7/2016 | Parker et al. |
| 9,387,325 B1 | 7/2016 | Min et al. |
| 9,399,132 B2 | 7/2016 | Parramon et al. |
| 9,403,013 B2 | 8/2016 | Walker et al. |
| 9,409,020 B2 | 8/2016 | Parker |
| 9,415,154 B2 | 8/2016 | Leven |
| 9,474,903 B2 | 10/2016 | Chen et al. |
| 9,492,655 B2 | 11/2016 | Pianca et al. |
| 9,498,620 B2 | 11/2016 | Romero et al. |
| 9,526,897 B2 | 12/2016 | Chen et al. |
| 9,526,902 B2 | 12/2016 | Blum et al. |
| 9,533,141 B2 | 1/2017 | Black et al. |
| 9,533,148 B2 | 1/2017 | Carcieri |
| 9,561,380 B2 | 2/2017 | Carcieri et al. |
| 9,566,596 B2 | 2/2017 | Kim et al. |
| 9,572,982 B2 | 2/2017 | Burnes et al. |
| 9,586,053 B2 | 3/2017 | Moffitt et al. |
| 9,592,389 B2 | 3/2017 | Moffitt |
| 9,610,435 B2 | 4/2017 | Schleicher et al. |
| 9,636,498 B2 | 5/2017 | Leven |
| 9,643,014 B2 | 5/2017 | Zhang et al. |
| 9,643,017 B2 | 5/2017 | Carcieri et al. |
| 9,649,489 B2 | 5/2017 | Wechter et al. |
| 9,669,210 B2 | 6/2017 | Barker et al. |
| 9,713,720 B2 | 7/2017 | Zhu |
| 9,731,116 B2 | 8/2017 | Chen |
| 9,775,988 B2 | 10/2017 | Govea et al. |
| 9,781,086 B2 | 10/2017 | Jelatis et al. |
| 9,792,412 B2 | 10/2017 | Moffitt et al. |
| 9,821,167 B2 | 11/2017 | Carcieri et al. |
| 9,872,990 B2 | 1/2018 | Parker et al. |
| 9,887,470 B2 | 2/2018 | Nguyen-Stella et al. |
| 9,925,382 B2 | 3/2018 | Carlton et al. |
| 9,959,388 B2 | 5/2018 | Grandhe et al. |
| 9,959,940 B2 | 5/2018 | Moffitt et al. |
| 9,974,455 B2 | 5/2018 | Parker et al. |
| 9,974,959 B2 | 5/2018 | Moffitt et al. |
| 9,987,482 B2 | 6/2018 | Nageri et al. |
| 10,067,659 B2 | 9/2018 | Bokil |
| 10,071,242 B2 | 9/2018 | Leven |
| 10,071,249 B2 | 9/2018 | Zottola |
| 10,076,667 B2 | 9/2018 | Kaula et al. |
| 10,086,202 B2 | 10/2018 | Seim et al. |
| 10,086,205 B2 | 10/2018 | Grill et al. |
| 10,213,148 B2 | 2/2019 | Min et al. |
| 10,226,616 B2 | 3/2019 | Barker |
| 10,265,528 B2 | 4/2019 | Carcieri et al. |
| 10,265,531 B2 | 4/2019 | Bokil |
| 10,286,205 B2 | 5/2019 | Steinke et al. |
| 10,300,282 B2 | 5/2019 | Torgerson et al. |
| 10,335,607 B2 | 7/2019 | Orinski |
| 10,350,404 B2 | 7/2019 | Zhang et al. |
| 10,357,657 B2 | 7/2019 | Moffitt et al. |
| 10,369,364 B2 | 8/2019 | Moffitt et al. |
| 10,406,353 B2 | 9/2019 | Wechter |
| 10,441,800 B2 | 10/2019 | Steinke |
| 10,485,969 B2 | 11/2019 | Govea et al. |
| 10,493,269 B2 | 12/2019 | Stoffregen et al. |
| 10,525,257 B2 | 1/2020 | Govea et al. |
| 10,525,266 B2 | 1/2020 | Moffitt et al. |
| 10,603,498 B2 | 3/2020 | Blum et al. |
| 10,625,072 B2 | 4/2020 | Serrano Carmona |
| 10,625,082 B2 | 4/2020 | Laghi |
| 10,631,937 B2 | 4/2020 | Tyulmankov et al. |
| 10,639,488 B2 | 5/2020 | Kalgren et al. |
| 10,653,330 B2 | 5/2020 | Angle et al. |
| 10,675,468 B2 | 6/2020 | Torgerson |
| 10,709,886 B2 | 7/2020 | Nagaoka et al. |
| 10,709,888 B2 | 7/2020 | Pianca |
| 10,716,505 B2 | 7/2020 | Blum et al. |
| 10,716,942 B2 | 7/2020 | Zhang |
| 10,744,330 B2 | 8/2020 | Moffitt et al. |
| 10,780,282 B2 | 9/2020 | Mustakos et al. |
| 10,814,127 B2 | 10/2020 | Nageri et al. |
| 10,814,140 B2 | 10/2020 | Zhang et al. |
| 10,835,739 B2 | 11/2020 | Sandhu |
| 10,850,101 B2 | 12/2020 | Zhang et al. |
| 10,857,351 B2 | 12/2020 | Wang et al. |
| 10,960,203 B2 | 3/2021 | Tyler et al. |
| 11,020,052 B2 | 6/2021 | Zuckerman-Stark et al. |
| 11,285,329 B2 | 3/2022 | Carcieri et al. |
| 11,298,550 B2 | 4/2022 | Howard et al. |
| 11,357,986 B2 | 6/2022 | Steinke et al. |
| 11,517,755 B2 | 12/2022 | Zhang et al. |
| 11,529,510 B2 | 12/2022 | Leven |
| 11,707,622 B2 | 7/2023 | Juarez Paz et al. |
| 11,745,010 B2 | 9/2023 | Donega et al. |
| 2001/0031071 A1 | 10/2001 | Nichols et al. |
| 2002/0032375 A1 | 3/2002 | Bauch et al. |
| 2002/0062143 A1 | 5/2002 | Baudino et al. |
| 2002/0087201 A1 | 7/2002 | Firlik et al. |
| 2002/0099295 A1 | 7/2002 | Gil et al. |
| 2002/0115603 A1 | 8/2002 | Whitehouse |
| 2002/0116030 A1 | 8/2002 | Rezei |
| 2002/0123780 A1 | 9/2002 | Grill et al. |
| 2002/0128694 A1 | 9/2002 | Holsheimer |
| 2002/0151939 A1 | 10/2002 | Rezai |
| 2002/0156513 A1 | 10/2002 | Borkan |
| 2002/0183607 A1 | 12/2002 | Bauch et al. |
| 2002/0183740 A1 | 12/2002 | Edwards et al. |
| 2002/0183817 A1 | 12/2002 | Van Venrooij et al. |
| 2003/0097159 A1 | 5/2003 | Schiff et al. |
| 2003/0139781 A1 | 7/2003 | Bradley et al. |
| 2003/0149450 A1 | 8/2003 | Mayberg |
| 2003/0171791 A1 | 9/2003 | KenKnight et al. |
| 2003/0212439 A1 | 11/2003 | Schuler et al. |
| 2004/0034394 A1 | 2/2004 | Woods et al. |
| 2004/0044279 A1 | 3/2004 | Lewin et al. |
| 2004/0044378 A1 | 3/2004 | Holsheimer |
| 2004/0044379 A1 | 3/2004 | Holsheimer |
| 2004/0054297 A1 | 3/2004 | Wingeier et al. |
| 2004/0059395 A1 | 3/2004 | North et al. |
| 2004/0106916 A1 | 6/2004 | Quaid et al. |
| 2004/0133248 A1 | 7/2004 | Frei et al. |
| 2004/0152957 A1 | 8/2004 | Stivoric et al. |
| 2004/0181262 A1 | 9/2004 | Bauhahn |
| 2004/0186532 A1 | 9/2004 | Tadlock |
| 2004/0193231 A1 | 9/2004 | David et al. |
| 2004/0199216 A1 | 10/2004 | Lee et al. |
| 2004/0267330 A1 | 12/2004 | Lee et al. |
| 2005/0021090 A1 | 1/2005 | Schuler et al. |
| 2005/0033380 A1 | 2/2005 | Tanner et al. |
| 2005/0049649 A1 | 3/2005 | Luders et al. |
| 2005/0060001 A1 | 3/2005 | Singhal et al. |
| 2005/0060009 A1 | 3/2005 | Goetz |
| 2005/0070781 A1 | 3/2005 | Dawant et al. |
| 2005/0075689 A1 | 4/2005 | Toy et al. |
| 2005/0085714 A1 | 4/2005 | Foley et al. |
| 2005/0113705 A1 | 5/2005 | Fischell et al. |

(56) References Cited

U.S. PATENT DOCUMENTS

| | | |
|---|---|---|
| 2005/0113885 A1 | 5/2005 | Haubrich et al. |
| 2005/0165294 A1 | 7/2005 | Weiss |
| 2005/0171587 A1 | 8/2005 | Daglow et al. |
| 2005/0228250 A1 | 10/2005 | Bitter et al. |
| 2005/0246004 A1 | 11/2005 | Cameron et al. |
| 2005/0251061 A1 | 11/2005 | Schuler et al. |
| 2005/0261061 A1 | 11/2005 | Nguyen et al. |
| 2005/0261601 A1 | 11/2005 | Schuler et al. |
| 2005/0261747 A1 | 11/2005 | Schuler et al. |
| 2005/0267347 A1 | 12/2005 | Oster |
| 2005/0288732 A1 | 12/2005 | Schuler et al. |
| 2006/0004422 A1 | 1/2006 | De Ridder |
| 2006/0017749 A1 | 1/2006 | McIntyre et al. |
| 2006/0020292 A1 | 1/2006 | Goetz et al. |
| 2006/0069415 A1 | 3/2006 | Cameron et al. |
| 2006/0094951 A1 | 5/2006 | Dean et al. |
| 2006/0095088 A1 | 5/2006 | Riddler |
| 2006/0155340 A1 | 7/2006 | Schuler et al. |
| 2006/0173496 A1 | 8/2006 | Lombardi et al. |
| 2006/0206169 A1 | 9/2006 | Schuler |
| 2006/0218007 A1 | 9/2006 | Bjorner et al. |
| 2006/0224189 A1 | 10/2006 | Schuler et al. |
| 2006/0235472 A1 | 10/2006 | Goetz et al. |
| 2006/0259079 A1 | 11/2006 | King |
| 2006/0259099 A1 | 11/2006 | Goetz et al. |
| 2007/0000372 A1 | 1/2007 | Rezai et al. |
| 2007/0017749 A1 | 1/2007 | Dold et al. |
| 2007/0027499 A1 | 2/2007 | Maschino et al. |
| 2007/0027514 A1 | 2/2007 | Gerber |
| 2007/0043268 A1 | 2/2007 | Russell |
| 2007/0043401 A1 | 2/2007 | John |
| 2007/0049817 A1 | 3/2007 | Preiss et al. |
| 2007/0067003 A1 | 3/2007 | Sanchez et al. |
| 2007/0067004 A1 | 3/2007 | Boveja et al. |
| 2007/0078498 A1 | 4/2007 | Rezai et al. |
| 2007/0083104 A1 | 4/2007 | Butson et al. |
| 2007/0123953 A1 | 5/2007 | Lee et al. |
| 2007/0129769 A1 | 6/2007 | Bourget et al. |
| 2007/0135855 A1 | 6/2007 | Foshee et al. |
| 2007/0150026 A1 | 6/2007 | Bourget et al. |
| 2007/0150036 A1 | 6/2007 | Anderson |
| 2007/0156186 A1 | 7/2007 | Lee et al. |
| 2007/0162086 A1 | 7/2007 | DiLorenzo |
| 2007/0162235 A1 | 7/2007 | Zhan et al. |
| 2007/0168004 A1 | 7/2007 | Walter |
| 2007/0168007 A1 | 7/2007 | Kuzma et al. |
| 2007/0179557 A1 | 8/2007 | Maschino et al. |
| 2007/0185544 A1 | 8/2007 | Dawant et al. |
| 2007/0191887 A1 | 8/2007 | Schuler et al. |
| 2007/0191912 A1 | 8/2007 | Ficher et al. |
| 2007/0197891 A1 | 8/2007 | Shachar et al. |
| 2007/0203450 A1 | 8/2007 | Berry |
| 2007/0203532 A1 | 8/2007 | Tass et al. |
| 2007/0203537 A1 | 8/2007 | Goetz et al. |
| 2007/0203538 A1 | 8/2007 | Stone et al. |
| 2007/0203539 A1 | 8/2007 | Stone et al. |
| 2007/0203540 A1 | 8/2007 | Goetz et al. |
| 2007/0203541 A1 | 8/2007 | Goetz et al. |
| 2007/0203543 A1 | 8/2007 | Stone et al. |
| 2007/0203544 A1 | 8/2007 | Goetz et al. |
| 2007/0203545 A1 | 8/2007 | Stone et al. |
| 2007/0203546 A1 | 8/2007 | Stone et al. |
| 2007/0213789 A1 | 9/2007 | Nolan et al. |
| 2007/0213790 A1 | 9/2007 | Nolan et al. |
| 2007/0244519 A1 | 10/2007 | Keacher et al. |
| 2007/0245318 A1 | 10/2007 | Goetz et al. |
| 2007/0255321 A1 | 11/2007 | Gerber et al. |
| 2007/0255322 A1 | 11/2007 | Gerber et al. |
| 2007/0260283 A1 | 11/2007 | Li |
| 2007/0265664 A1 | 11/2007 | Gerber et al. |
| 2007/0276441 A1 | 11/2007 | Goetz |
| 2007/0282189 A1 | 12/2007 | Dan et al. |
| 2007/0288064 A1 | 12/2007 | Butson et al. |
| 2008/0027514 A1 | 1/2008 | DeMulling et al. |
| 2008/0039895 A1 | 2/2008 | Fowler et al. |
| 2008/0046037 A1 | 2/2008 | Haubrich et al. |
| 2008/0071150 A1 | 3/2008 | Miesel et al. |
| 2008/0081982 A1 | 4/2008 | Simon et al. |
| 2008/0086451 A1 | 4/2008 | Torres et al. |
| 2008/0091248 A1 | 4/2008 | Libbus et al. |
| 2008/0103533 A1 | 5/2008 | Patel et al. |
| 2008/0114233 A1 | 5/2008 | McIntyre et al. |
| 2008/0114579 A1 | 5/2008 | McIntyre et al. |
| 2008/0123922 A1 | 5/2008 | Gielen et al. |
| 2008/0123923 A1 | 5/2008 | Gielen et al. |
| 2008/0133141 A1 | 6/2008 | Frost |
| 2008/0141217 A1 | 6/2008 | Goetz et al. |
| 2008/0146894 A1 | 6/2008 | Bulkes et al. |
| 2008/0154340 A1 | 6/2008 | Goetz et al. |
| 2008/0154341 A1 | 6/2008 | McIntyre et al. |
| 2008/0163097 A1 | 7/2008 | Goetz et al. |
| 2008/0183256 A1 | 7/2008 | Keacher |
| 2008/0188734 A1 | 8/2008 | Suryanarayanan et al. |
| 2008/0215101 A1 | 9/2008 | Rezai et al. |
| 2008/0215118 A1 | 9/2008 | Goetz et al. |
| 2008/0227139 A1 | 9/2008 | Deisseroth et al. |
| 2008/0238749 A1 | 10/2008 | Comdorf |
| 2008/0242950 A1 | 10/2008 | Jung et al. |
| 2008/0261165 A1 | 10/2008 | Steingart et al. |
| 2008/0269588 A1 | 10/2008 | Csavoy et al. |
| 2008/0300654 A1 | 12/2008 | Lambert et al. |
| 2008/0300797 A1 | 12/2008 | Tabibiazar et al. |
| 2009/0016491 A1 | 1/2009 | Li |
| 2009/0054947 A1 | 2/2009 | Bourn et al. |
| 2009/0054950 A1 | 2/2009 | Stephens |
| 2009/0082640 A1 | 3/2009 | Kovach et al. |
| 2009/0082829 A1 | 3/2009 | Panken et al. |
| 2009/0105785 A1 | 4/2009 | Wei et al. |
| 2009/0112289 A1 | 4/2009 | Lee et al. |
| 2009/0118635 A1 | 5/2009 | Lujan et al. |
| 2009/0118786 A1 | 5/2009 | Meadows et al. |
| 2009/0149917 A1 | 6/2009 | Whitehurst et al. |
| 2009/0163975 A1 | 6/2009 | Gerber et al. |
| 2009/0187222 A1 | 7/2009 | Barker |
| 2009/0196471 A1 | 8/2009 | Goetz et al. |
| 2009/0196472 A1 | 8/2009 | Goetz et al. |
| 2009/0198306 A1 | 8/2009 | Goetz et al. |
| 2009/0198354 A1 | 8/2009 | Wilson |
| 2009/0204192 A1 | 8/2009 | Carlton et al. |
| 2009/0208073 A1 | 8/2009 | McIntyre et al. |
| 2009/0210208 A1 | 8/2009 | Mcintyre et al. |
| 2009/0216141 A1 | 8/2009 | Fischell et al. |
| 2009/0228073 A1* | 9/2009 | Scholten ............ A61B 5/0031 607/60 |
| 2009/0242399 A1 | 10/2009 | Kamath et al. |
| 2009/0270949 A1 | 10/2009 | Kalpin et al. |
| 2009/0276008 A1 | 11/2009 | Lee et al. |
| 2009/0276021 A1 | 11/2009 | Meadows et al. |
| 2009/0281595 A1 | 11/2009 | King et al. |
| 2009/0281596 A1 | 11/2009 | King et al. |
| 2009/0287271 A1 | 11/2009 | Blum et al. |
| 2009/0287272 A1 | 11/2009 | Kokones et al. |
| 2009/0287273 A1 | 11/2009 | Carlton et al. |
| 2009/0287467 A1 | 11/2009 | Sparks et al. |
| 2009/0299164 A1 | 12/2009 | Singhal et al. |
| 2009/0299165 A1 | 12/2009 | Singhal et al. |
| 2009/0299380 A1 | 12/2009 | Singhal et al. |
| 2010/0010387 A1 | 1/2010 | Skelton et al. |
| 2010/0010432 A1 | 1/2010 | Skelton |
| 2010/0010566 A1 | 1/2010 | Thacker et al. |
| 2010/0010646 A1 | 1/2010 | Drew et al. |
| 2010/0023090 A1 | 1/2010 | Jaax et al. |
| 2010/0023103 A1 | 1/2010 | Elborno |
| 2010/0023130 A1 | 1/2010 | Henry et al. |
| 2010/0030312 A1 | 2/2010 | Shen |
| 2010/0049276 A1 | 2/2010 | Blum et al. |
| 2010/0049280 A1 | 2/2010 | Goetz |
| 2010/0057161 A1 | 3/2010 | Machado et al. |
| 2010/0064249 A1 | 3/2010 | Groetken |
| 2010/0076535 A1 | 3/2010 | Pianca et al. |
| 2010/0113959 A1 | 5/2010 | Pascual-Leon et al. |
| 2010/0114224 A1 | 5/2010 | Krause et al. |
| 2010/0121409 A1 | 5/2010 | Kothandaraman et al. |
| 2010/0135553 A1 | 6/2010 | Joglekar |

(56) References Cited

U.S. PATENT DOCUMENTS

| | | |
|---|---|---|
| 2010/0137944 A1 | 6/2010 | Zhu |
| 2010/0152604 A1 | 6/2010 | Kuala et al. |
| 2010/0152807 A1 | 6/2010 | Grill et al. |
| 2010/0179562 A1 | 7/2010 | Linker et al. |
| 2010/0211135 A1 | 8/2010 | Caparso et al. |
| 2010/0268298 A1 | 10/2010 | Moffitt |
| 2010/0305642 A1 | 12/2010 | Dong et al. |
| 2010/0324410 A1 | 12/2010 | Paek et al. |
| 2010/0331883 A1 | 12/2010 | Schmitz et al. |
| 2010/0331916 A1 | 12/2010 | Parramon et al. |
| 2011/0004267 A1 | 1/2011 | Meadows |
| 2011/0005069 A1 | 1/2011 | Pianca |
| 2011/0040351 A1 | 2/2011 | Buston et al. |
| 2011/0054559 A1 | 3/2011 | Rosenberg et al. |
| 2011/0066407 A1 | 3/2011 | Butson et al. |
| 2011/0078900 A1 | 4/2011 | Pianca et al. |
| 2011/0093045 A1 | 4/2011 | Moffitt |
| 2011/0130803 A1 | 6/2011 | McDonald |
| 2011/0130816 A1 | 6/2011 | Howard et al. |
| 2011/0130817 A1 | 6/2011 | Chen |
| 2011/0130818 A1 | 6/2011 | Chen |
| 2011/0137372 A1 | 6/2011 | Makous et al. |
| 2011/0160796 A1 | 6/2011 | Lane et al. |
| 2011/0172737 A1 | 7/2011 | Davis et al. |
| 2011/0184487 A1 | 7/2011 | Alberts et al. |
| 2011/0191275 A1 | 8/2011 | Lujan et al. |
| 2011/0196253 A1 | 8/2011 | McIntyre et al. |
| 2011/0213440 A1 | 9/2011 | Fowler et al. |
| 2011/0224665 A1 | 9/2011 | Crosby et al. |
| 2011/0224680 A1 | 9/2011 | Barker |
| 2011/0238129 A1 | 9/2011 | Moffitt |
| 2011/0251583 A1 | 10/2011 | Miyazawa et al. |
| 2011/0270348 A1 | 11/2011 | Goetz |
| 2011/0306845 A1 | 12/2011 | Osorio |
| 2011/0306846 A1 | 12/2011 | Osorio |
| 2011/0307032 A1 | 12/2011 | Goetz et al. |
| 2011/0313485 A1 | 12/2011 | DeMulling et al. |
| 2011/0313500 A1 | 12/2011 | Barker et al. |
| 2012/0016378 A1 | 1/2012 | Pianca et al. |
| 2012/0027272 A1 | 2/2012 | Akinyemi et al. |
| 2012/0046710 A1 | 2/2012 | Digiore et al. |
| 2012/0046715 A1 | 2/2012 | Moffitt et al. |
| 2012/0071949 A1 | 3/2012 | Pianca et al. |
| 2012/0078106 A1 | 3/2012 | Dentinger et al. |
| 2012/0089205 A1 | 4/2012 | Boyden et al. |
| 2012/0092031 A1 | 4/2012 | Shi et al. |
| 2012/0095519 A1 | 4/2012 | Parramon et al. |
| 2012/0095529 A1 | 4/2012 | Parramon et al. |
| 2012/0101552 A1 | 4/2012 | Lazarewicz et al. |
| 2012/0116476 A1 | 5/2012 | Kothandaraman |
| 2012/0165898 A1 | 6/2012 | Moffitt |
| 2012/0165901 A1 | 6/2012 | Zhu et al. |
| 2012/0165911 A1 | 6/2012 | Pianca |
| 2012/0188096 A1 | 7/2012 | Corndorf et al. |
| 2012/0197375 A1 | 8/2012 | Pianca et al. |
| 2012/0203316 A1 | 8/2012 | Moffitt et al. |
| 2012/0203320 A1 | 8/2012 | Digiore et al. |
| 2012/0203321 A1 | 8/2012 | Moffitt et al. |
| 2012/0203366 A1 | 8/2012 | Saliger et al. |
| 2012/0207378 A1 | 8/2012 | Gupta et al. |
| 2012/0226138 A1 | 9/2012 | DeSalles et al. |
| 2012/0229468 A1 | 9/2012 | Lee et al. |
| 2012/0239109 A1 | 9/2012 | Lee |
| 2012/0239115 A1 | 9/2012 | Lee |
| 2012/0265103 A1 | 10/2012 | Policker et al. |
| 2012/0265262 A1 | 10/2012 | Osorio |
| 2012/0265268 A1 | 10/2012 | Blum et al. |
| 2012/0271189 A1 | 10/2012 | Nelson et al. |
| 2012/0277833 A1 | 11/2012 | Gerber et al. |
| 2012/0302912 A1 | 11/2012 | Moffitt et al. |
| 2012/0303087 A1 | 11/2012 | Moffitt et al. |
| 2012/0303098 A1 | 11/2012 | Perryman |
| 2012/0314919 A1 | 12/2012 | Sparks et al. |
| 2012/0314924 A1 | 12/2012 | Carlton et al. |
| 2012/0316615 A1 | 12/2012 | Digiore et al. |
| 2012/0316619 A1 | 12/2012 | Goetz et al. |
| 2012/0330374 A1 | 12/2012 | Blum et al. |
| 2012/0330622 A1 | 12/2012 | Butson et al. |
| 2013/0035740 A1 | 2/2013 | Sharma et al. |
| 2013/0039550 A1 | 2/2013 | Blum et al. |
| 2013/0053926 A1 | 2/2013 | Hincapie Ordonez et al. |
| 2013/0060301 A1 | 3/2013 | Polefko et al. |
| 2013/0060305 A1 | 3/2013 | Bokil |
| 2013/0105071 A1 | 5/2013 | Digiore et al. |
| 2013/0116744 A1 | 5/2013 | Blum et al. |
| 2013/0116748 A1 | 5/2013 | Bokil et al. |
| 2013/0116749 A1 | 5/2013 | Carlton et al. |
| 2013/0116929 A1 | 5/2013 | Carlton et al. |
| 2013/0150922 A1 | 6/2013 | Butson et al. |
| 2013/0197424 A1 | 8/2013 | Bedenbaugh |
| 2013/0197602 A1 | 8/2013 | Pianca et al. |
| 2013/0226261 A1 | 8/2013 | Sparks et al. |
| 2013/0261684 A1 | 10/2013 | Howard |
| 2013/0289380 A1 | 10/2013 | Molnar et al. |
| 2013/0289660 A1 | 10/2013 | Molnar et al. |
| 2013/0289665 A1 | 10/2013 | Marnfeldt et al. |
| 2013/0317572 A1 | 11/2013 | Zhu et al. |
| 2013/0317573 A1 | 11/2013 | Zhu et al. |
| 2013/0317587 A1 | 11/2013 | Barker |
| 2013/0325091 A1 | 12/2013 | Pianca et al. |
| 2014/0012341 A1 | 1/2014 | Von Arx et al. |
| 2014/0031901 A1 | 1/2014 | Zhu et al. |
| 2014/0039586 A1 | 2/2014 | Barker et al. |
| 2014/0039587 A1 | 2/2014 | Romero |
| 2014/0063017 A1 | 3/2014 | Kaula et al. |
| 2014/0066999 A1 | 3/2014 | Carcieri et al. |
| 2014/0067018 A1 | 3/2014 | Carcieri et al. |
| 2014/0067022 A1 | 3/2014 | Carcieri et al. |
| 2014/0074180 A1 | 3/2014 | Heldman et al. |
| 2014/0081366 A1 | 3/2014 | Bentley et al. |
| 2014/0107731 A1 | 4/2014 | Stone et al. |
| 2014/0122379 A1 | 5/2014 | Moffitt et al. |
| 2014/0194772 A1 | 7/2014 | Single et al. |
| 2014/0200633 A1 | 7/2014 | Moffitt |
| 2014/0236042 A1 | 8/2014 | Parker et al. |
| 2014/0243926 A1 | 8/2014 | Carcieri |
| 2014/0276707 A1 | 9/2014 | Jaax |
| 2014/0276927 A1 | 9/2014 | Barker |
| 2014/0277282 A1 | 9/2014 | Jaax |
| 2014/0277284 A1 | 9/2014 | Chen et al. |
| 2014/0296737 A1 | 10/2014 | Parker et al. |
| 2014/0296953 A1 | 10/2014 | Pianca et al. |
| 2014/0343647 A1 | 11/2014 | Romero et al. |
| 2014/0353001 A1 | 12/2014 | Romero et al. |
| 2014/0353501 A1 | 12/2014 | Fantone et al. |
| 2014/0358024 A1 | 12/2014 | Nelson et al. |
| 2014/0358207 A1 | 12/2014 | Romero |
| 2014/0358208 A1 | 12/2014 | Howard et al. |
| 2014/0358209 A1 | 12/2014 | Romero et al. |
| 2014/0358210 A1 | 12/2014 | Howard et al. |
| 2015/0018699 A1 | 1/2015 | Zeng et al. |
| 2015/0018915 A1 | 1/2015 | Leven |
| 2015/0021817 A1 | 1/2015 | Romero et al. |
| 2015/0045864 A1 | 2/2015 | Howard |
| 2015/0051681 A1 | 2/2015 | Hershey |
| 2015/0066111 A1 | 3/2015 | Blum et al. |
| 2015/0066120 A1 | 3/2015 | Govea |
| 2015/0073431 A1 | 3/2015 | Barker |
| 2015/0073432 A1 | 3/2015 | Barker |
| 2015/0119751 A1 | 4/2015 | Stanslaski et al. |
| 2015/0134031 A1 | 5/2015 | Moffitt et al. |
| 2015/0151113 A1 | 6/2015 | Govea et al. |
| 2015/0157861 A1 | 6/2015 | Aghassian |
| 2015/0246231 A1 | 9/2015 | Martens et al. |
| 2015/0282725 A1 | 10/2015 | Single |
| 2015/0306391 A1 | 10/2015 | Wu et al. |
| 2015/0313487 A1 | 11/2015 | Single et al. |
| 2015/0348554 A1 | 12/2015 | Orr et al. |
| 2015/0360038 A1 | 12/2015 | Zottola et al. |
| 2015/0360039 A1 | 12/2015 | Lempka et al. |
| 2016/0001087 A1 | 1/2016 | Moffitt |
| 2016/0008632 A1 | 1/2016 | Wetmore et al. |
| 2016/0022995 A1 | 1/2016 | Kothandaraman et al. |
| 2016/0023008 A1 | 1/2016 | Kothandaraman |

(56) References Cited

U.S. PATENT DOCUMENTS

| | | |
|---|---|---|
| 2016/0030749 A1 | 2/2016 | Carcieri et al. |
| 2016/0030750 A1 | 2/2016 | Bokil et al. |
| 2016/0045748 A1 | 2/2016 | Astrom et al. |
| 2016/0082252 A1 | 3/2016 | Hershey et al. |
| 2016/0096025 A1 | 4/2016 | Moffitt et al. |
| 2016/0136429 A1 | 5/2016 | Massoumi et al. |
| 2016/0136443 A1 | 5/2016 | Kothandaraman et al. |
| 2016/0144186 A1 | 5/2016 | Kaemmerer et al. |
| 2016/0166164 A1 | 6/2016 | Obradovic et al. |
| 2016/0175594 A1 | 6/2016 | Min et al. |
| 2016/0206380 A1 | 7/2016 | Sparks et al. |
| 2016/0228692 A1 | 8/2016 | Steinke et al. |
| 2016/0256691 A1 | 9/2016 | Cecchi et al. |
| 2016/0256693 A1 | 9/2016 | Parramon |
| 2016/0287126 A1 | 10/2016 | Parker et al. |
| 2016/0287182 A1 | 10/2016 | Single |
| 2016/0317800 A1 | 11/2016 | Barker |
| 2016/0346557 A1 | 12/2016 | Bokil |
| 2016/0375248 A1 | 12/2016 | Carcieri et al. |
| 2016/0375258 A1 | 12/2016 | Steinke |
| 2017/0049345 A1 | 2/2017 | Single |
| 2017/0071490 A1 | 3/2017 | Parker et al. |
| 2017/0100593 A1 | 4/2017 | Zottola |
| 2017/0100601 A1 | 4/2017 | Xiao et al. |
| 2017/0106197 A1 | 4/2017 | Wechter et al. |
| 2017/0113046 A1 | 4/2017 | Fried et al. |
| 2017/0135624 A1 | 5/2017 | Parker |
| 2017/0136243 A1 | 5/2017 | Lee et al. |
| 2017/0157410 A1 | 6/2017 | Moffitt et al. |
| 2017/0173335 A1 | 6/2017 | Min et al. |
| 2017/0197086 A1 | 7/2017 | Howard et al. |
| 2017/0216587 A1 | 8/2017 | Parker |
| 2017/0225007 A1 | 8/2017 | Orinski |
| 2017/0252570 A1 | 9/2017 | Serrano Carmona et al. |
| 2017/0259065 A1 | 9/2017 | Baru et al. |
| 2017/0259078 A1 | 9/2017 | Howard |
| 2017/0281958 A1 | 10/2017 | Serrano Carmona et al. |
| 2017/0296823 A1 | 10/2017 | Hershey et al. |
| 2017/0304610 A1 | 10/2017 | Huibregtse et al. |
| 2017/0304633 A1 | 10/2017 | Zhang |
| 2017/0333692 A1 | 11/2017 | Stoffregen et al. |
| 2017/0361101 A1 | 12/2017 | Single |
| 2017/0372039 A1 | 12/2017 | Mustakos et al. |
| 2018/0028083 A1 | 2/2018 | Greenhut et al. |
| 2018/0064930 A1 | 3/2018 | Zhang et al. |
| 2018/0071513 A1 | 3/2018 | Weiss et al. |
| 2018/0071520 A1 | 3/2018 | Weerakoon et al. |
| 2018/0071527 A1 | 3/2018 | Feldman et al. |
| 2018/0071530 A1 | 3/2018 | Giftakis et al. |
| 2018/0078769 A1 | 3/2018 | Dinsmoor et al. |
| 2018/0078776 A1 | 3/2018 | Mustakos et al. |
| 2018/0104482 A1 | 4/2018 | Bokil |
| 2018/0104500 A1 | 4/2018 | Blum et al. |
| 2018/0110971 A1 | 4/2018 | Serrano Carmona |
| 2018/0110987 A1 | 4/2018 | Parker |
| 2018/0117335 A1 | 5/2018 | Parker et al. |
| 2018/0132747 A1 | 5/2018 | Parker et al. |
| 2018/0133481 A1 | 5/2018 | Von Zitzewitz et al. |
| 2018/0140831 A1 | 5/2018 | Feldman et al. |
| 2018/0185650 A1 | 7/2018 | Shah |
| 2018/0193655 A1 | 7/2018 | Zhang et al. |
| 2018/0214700 A1 | 8/2018 | Vansickle et al. |
| 2018/0228391 A1 | 8/2018 | Parker et al. |
| 2018/0228547 A1 | 8/2018 | Parker et al. |
| 2018/0256052 A1 | 9/2018 | Parker et al. |
| 2018/0264278 A1 | 9/2018 | Laghi |
| 2018/0272142 A1 | 9/2018 | Zhang et al. |
| 2018/0280698 A1 | 10/2018 | Steinke et al. |
| 2018/0289967 A1 | 10/2018 | Bokil |
| 2018/0296828 A1 | 10/2018 | Bradley et al. |
| 2018/0333173 A1 | 11/2018 | Wang |
| 2018/0333587 A1 | 11/2018 | Howard |
| 2018/0369589 A1 | 12/2018 | Schouenborg |
| 2018/0369606 A1 | 12/2018 | Zhang et al. |
| 2018/0369607 A1 | 12/2018 | Zhang et al. |
| 2019/0015660 A1 | 1/2019 | Zhang et al. |
| 2019/0036886 A1 | 1/2019 | Wu et al. |
| 2019/0099602 A1 | 4/2019 | Esteller et al. |
| 2019/0105503 A1 | 4/2019 | Leven |
| 2019/0156818 A1 | 5/2019 | Piersol et al. |
| 2019/0175915 A1 | 6/2019 | Brill et al. |
| 2019/0184171 A1 | 6/2019 | Mustakos et al. |
| 2019/0209834 A1 | 7/2019 | Zhang et al. |
| 2019/0209844 A1 | 7/2019 | Esteller et al. |
| 2019/0209849 A1 | 7/2019 | Hershey et al. |
| 2019/0262609 A1 | 8/2019 | Brill et al. |
| 2019/0275331 A1 | 9/2019 | Zhu |
| 2019/0290900 A1 | 9/2019 | Esteller et al. |
| 2019/0298992 A1 | 10/2019 | Zhang et al. |
| 2019/0299006 A1 | 10/2019 | Marnfeldt |
| 2019/0329047 A1 | 10/2019 | Moffitt et al. |
| 2019/0329049 A1 | 10/2019 | Carcieri et al. |
| 2019/0366094 A1 | 12/2019 | Esteller et al. |
| 2020/0094047 A1 | 3/2020 | Govea et al. |
| 2020/0139127 A1 | 5/2020 | Zhang et al. |
| 2020/0139140 A1 | 5/2020 | Crawford et al. |
| 2020/0155019 A1 | 5/2020 | Esteller et al. |
| 2020/0155854 A1 | 5/2020 | Leven et al. |
| 2020/0155859 A1 | 5/2020 | Blum et al. |
| 2020/0171298 A1 | 6/2020 | Goetz et al. |
| 2020/0171310 A1 | 6/2020 | Walter et al. |
| 2020/0179600 A1 | 6/2020 | Zanos et al. |
| 2020/0179701 A1 | 6/2020 | Pronovici et al. |
| 2020/0215330 A1 | 7/2020 | Huertas Fernandez et al. |
| 2020/0222704 A1 | 7/2020 | Moffitt et al. |
| 2020/0269053 A1 | 8/2020 | Park |
| 2020/0305716 A1 | 10/2020 | Mondello et al. |
| 2020/0305745 A1 | 10/2020 | Wagenbach et al. |
| 2020/0353254 A1 | 11/2020 | OLaighin et al. |
| 2020/0376262 A1 | 12/2020 | Clark et al. |
| 2020/0376263 A1 | 12/2020 | Zhu |
| 2020/0398057 A1 | 12/2020 | Esteller et al. |
| 2021/0008388 A1 | 1/2021 | Vansickle et al. |
| 2021/0008389 A1 | 1/2021 | Featherstone et al. |
| 2021/0016111 A1 | 1/2021 | Vansickle et al. |
| 2021/0023374 A1 | 1/2021 | Block et al. |
| 2021/0052893 A1 | 2/2021 | Suri et al. |
| 2021/0113844 A1 | 4/2021 | Zhang et al. |
| 2021/0128920 A1 | 5/2021 | Grill et al. |
| 2021/0196956 A1 | 7/2021 | Juárez Paz |
| 2021/0196964 A1 | 7/2021 | Schnell et al. |
| 2021/0205613 A1 | 7/2021 | Bradley et al. |
| 2021/0268268 A1 | 9/2021 | Horn et al. |
| 2021/0275820 A1 | 9/2021 | Grill, Jr. et al. |
| 2021/0316139 A1 | 10/2021 | Shelton et al. |
| 2021/0387002 A1 | 12/2021 | Bourget et al. |
| 2022/0007980 A1 | 1/2022 | Single |
| 2022/0008729 A1 | 1/2022 | Zhu |
| 2022/0040485 A1 | 2/2022 | Li et al. |
| 2022/0062640 A1 | 3/2022 | Raike et al. |
| 2022/0072329 A1 | 3/2022 | Howard |
| 2022/0111213 A1 | 4/2022 | Cassar et al. |
| 2022/0126100 A1 | 4/2022 | Jackson et al. |
| 2022/0141663 A1 | 5/2022 | Kothandaraman et al. |
| 2022/0148591 A1 | 5/2022 | Chao et al. |
| 2022/0226641 A1 | 7/2022 | Subramanian |
| 2022/0257950 A1 | 8/2022 | Moore et al. |
| 2022/0266026 A1 | 8/2022 | Case et al. |
| 2022/0296892 A1 | 9/2022 | Esteller et al. |
| 2022/0296893 A1 | 9/2022 | Steinke et al. |
| 2022/0339448 A1 | 10/2022 | Jayakumar et al. |
| 2022/0347479 A1 | 11/2022 | Esteller et al. |
| 2022/0355114 A1 | 11/2022 | Moore et al. |
| 2022/0355115 A1 | 11/2022 | Moore et al. |
| 2022/0370793 A1 | 11/2022 | Foster et al. |
| 2022/0370808 A1 | 11/2022 | Esteller |
| 2022/0387785 A1 | 12/2022 | Huynh et al. |
| 2022/0395690 A1 | 12/2022 | Haddock et al. |
| 2023/0048571 A1 | 2/2023 | Poltorak |
| 2023/0064552 A1 | 3/2023 | Moffitt |
| 2023/0141183 A1 | 5/2023 | Moore et al. |
| 2023/0181089 A1 | 6/2023 | Zhang et al. |
| 2023/0181090 A1 | 6/2023 | Juarez Paz |
| 2023/0248977 A1 | 8/2023 | Esteller et al. |

(56) References Cited

U.S. PATENT DOCUMENTS

| | | |
|---|---|---|
| 2023/0264025 A1 | 8/2023 | Malekmohammadi et al. |
| 2023/0271015 A1 | 8/2023 | Malekmohammadi et al. |
| 2023/0277849 A1 | 9/2023 | Moffitt et al. |
| 2023/0277854 A1 | 9/2023 | Gaviao Kilmar |
| 2024/0058611 A1 | 2/2024 | Steinke et al. |
| 2024/0065620 A1 | 2/2024 | Moore et al. |
| 2024/0157151 A1 | 5/2024 | Juarez Paz |
| 2024/0198110 A1 | 6/2024 | Moore |
| 2024/0316346 A1 | 9/2024 | Shah et al. |
| 2024/0359015 A1 | 10/2024 | Steinke et al. |
| 2025/0010079 A1 | 1/2025 | Bokil |
| 2025/0050107 A1 | 2/2025 | Moore et al. |
| 2025/0099749 A1 | 3/2025 | Moffitt et al. |
| 2025/0249236 A1 | 8/2025 | Nageri et al. |
| 2025/0249251 A1 | 8/2025 | Gu et al. |

FOREIGN PATENT DOCUMENTS

| | | |
|---|---|---|
| EP | 1166819 | 1/2002 |
| EP | 1372780 | 1/2004 |
| EP | 1559369 | 8/2005 |
| EP | 2926728 | 10/2015 |
| WO | 97/39797 | 10/1997 |
| WO | 98/48880 | 11/1998 |
| WO | 01/90876 | 11/2001 |
| WO | 02/26314 | 4/2002 |
| WO | 02/28473 | 4/2002 |
| WO | 02/065896 | 8/2002 |
| WO | 02/072192 | 9/2002 |
| WO | 03/086185 | 10/2003 |
| WO | 2004/019799 A2 | 3/2004 |
| WO | 2004041080 | 5/2005 |
| WO | 2006017053 | 2/2006 |
| WO | 2006113305 | 10/2006 |
| WO | 2006/119131 | 11/2006 |
| WO | 20071097859 | 8/2007 |
| WO | 20071097861 A1 | 8/2007 |
| WO | 2007/100427 | 9/2007 |
| WO | 2007/100428 | 9/2007 |
| WO | 2007/112061 | 10/2007 |
| WO | 2009097224 | 8/2009 |
| WO | WO2009134476 A1 | 11/2009 |
| WO | 2010/109448 | 9/2010 |
| WO | 2010/120823 A2 | 10/2010 |
| WO | 2011025865 | 3/2011 |
| WO | 2011/139779 A1 | 11/2011 |
| WO | 2011/159688 A2 | 12/2011 |
| WO | 2012088482 | 6/2012 |
| WO | 2012/155186 | 11/2012 |
| WO | 2015/077362 | 5/2015 |
| WO | 2016/025913 | 2/2016 |
| WO | 2016081099 | 5/2016 |
| WO | 2016112398 | 7/2016 |
| WO | 2017/100866 | 6/2017 |
| WO | 2017/173493 | 10/2017 |
| WO | 2017/210352 | 12/2017 |
| WO | 2017/219096 | 12/2017 |
| WO | 2021/021659 | 2/2021 |

OTHER PUBLICATIONS

Foster, K. R., et al., "Dielectric properties of tissues and biological materials: a critical review.", Grit Rev Biomed Ena. 17(1). {1989),25-104.

Limousin, P., et al., "Electrical stimulation of the subthalamic nucleus in advanced Parkinson's disease", N Engl J Med .. 339(16), (Oct. 15, 1998), 1105-11.

Kitagawa, M., et al., "Two-year follow-up of chronic stimulation of the posterior subthalamic white matter for tremor-dominant Parkinson's disease.", Neurosurgery. 56(2). (Feb. 2005),281-9.

Johnson, M. D., et al., "Repeated voltage biasing improves unit recordings by reducing resistive tissue impedances", IEEE Transactions on Neural Systems and Rehabilitation Engineering, [see also IEEE Trans. on Rehabilitation Engineering (2005), 160-165.

Holsheimer, J., et al., "Chronaxie calculated from current-duration and voltage-duration data", J Neurosci Methods. 97(1). (Apr. 1, 2000),45-50.

Hardman, C. D., et al., "Comparison of the basal ganglia in rats, marmosets, macaques, baboons, and humans: volume and neuronal number for the output, internal relay, and striatal modulating nuclei", J Comp Neurol., 445(3). (Apr. 8, 2002), 238-55.

Hashimoto, T., et al., "Stimulation of the subthalamic nucleus changes the firing pattern of pallidal neurons", J Neurosci. 23(5). (Mar. 1, 2003), 1916-23.

Hershey, T., et al., "Cortical and subcortical blood flow effects of subthalamic nucleus stimulation in PD.", Neurology 61(6). (Sep. 23, 2003),816-21.

Hemm, S., et al., "Evolution of Brain Impedance in Dystonic Patients Treated by GPi Electrical Stimulation", Neuromodulation 7(2) (Apr. 2004), 67-75.

Hemm, S., et al., "Deep brain stimulation in movement disorders: stereotactic coregistration of two-dimensional electrical field modeling and magnetic resonance imaging.", J Neurosurg. 103(6): (Dec. 2005), 949-55.

C.R. Butson, J. Hall, J. Henderson, C. McIntyre. Patient-Specific Models of Deep Brain Stimulation: 3D Visualization of Anatomy, Electrode and Volume of Activation as a Function of Stimulation Parameters Program No. 1011.11. 2004 Abstract. Washington, DC: Society for Neuroscience, 2004. Online.

Trost M, Su S, Su P, Yen RF, Tseng HM, Barnes A, Ma Y, Eidelberg D. Network modulation by the subthalamic nucleus in the treatment of Parkinson's disease. Neuroimage. May 15, 2006;31(1):301-7. doi: 10.1016/j.neuroimage.2005.12.024. Epub Feb. 8, 2006.

Alo, K. M., et al., "New trends in neuromodulation for the management of neuropathic pain," Neurosurgery, 50(4), (Apr. 2002), pp. 690-703, discussion pp. 703-704.

Ashby, P., et al., "Neurophysiological effects of stimulation through electrodes in the human subthalamic nucleus," Brain, 122 (PI 10), (Oct. 1999), pp. 1919-1931.

Baker, K. B., et al., "Subthalamic nucleus deep brain stimulus evoked potentials: Physiological and therapeutic Implications," Movement Disorders, 17(5), (Sep./Oct. 2002), pp. 969-983.

Bammer, R, et al., "Diffusion tensor imaging using single-shot SENSE-EPI", Magn Reson Med., 48(1), (Jul. 2002), pp. 128-136.

Basser, p. J., et al., "MR diffusion tensor spectroscopy and imaging," Biophys J., 66(1), (Jan. 1994), pp. 259-267.

Basser, p. J., et al., "New currents in electrical stimulation of excitable tissues," Annu Rev Biomed Eng., 2, (2000), pp. 377-397.

Benabid, AL., et al., "Chronic electrical stimulation of the ventralis intermedius nucleus of the thalamus as a treatment of movement disorders," J. Neurosurg., 84(2), (Feb. 1996), pp. 203-214.

Benabid, AL., et al., "Combined (Ihalamotoy and stimulation) stereotactic surgery of the VIM thalamic nucleus for bilateral Parkinson disease," Appl Neurophysiol, vol. 50, (1987), pp. 344-346.

Benabid, A L., et al., "Long-term suppression of tremor by chronic stimulation of the ventral intermediate thalamic nucleus," Lancet, 337 (8738), (Feb. 16, 1991), pp. 403-406.

Benoit M. Dawant et al.: "The VU-DBS project: integrated and computer-assisted planning, intra-operative placement, and post-operative programming of deep-brain stimulators", Proceedings of SPIE, vol. 6509, Mar. 6, 2007 (Mar. 6, 2007), 11 pages.

Christensen, Gary E., et al., "Volumetric transformation of brain anatomy," IEEE Transactions on Medical Imaging, 16(6), (Dec. 1997), pp. 864-877.

Cooper, S, et al., "Differential effects of thalamic stimulation parameters on tremor and paresthesias in essential tremor," Movement Disorders, 17(Supp. 5), (2002), p. S193.

Coubes, P, et al., "Treatment of DYT1-generalised dystonia by stimulation of the internal globus pallidus," Lancet, 355 (9222), (Jun. 24, 2000), pp. 2220-2221.

Pulliam CL, Heldman DA, Orcutt TH, Mera TO, Giuffrida JP, Vitek JL. Motion sensor strategies for automated optimization of deep brain stimulation in Parkinson's disease. Parkinsonism Relat Disord. Apr. 2015; 21(4):378-82.

(56) References Cited

OTHER PUBLICATIONS

Dawant, B. M., et al., "Compuerized atlas-guided positioning of deep brain stimulators: a feasibility study," Biomedical Image registration, Second International Workshop, WBIR 2003, Revised Papers (Lecture notes in Comput. Sci. vol. 2717, Springer-Verlag Berlin, Germany(2003), pp. 142-150.
Finnis, K. W., et al., "3-D functional atlas of subcortical structures for image guided stereotactic neurosurgery," Neuroimage, vol. 9, No. 6, Iss. 2 (1999), p. S206.
Finnis, K. W., et al., "3D Functional Database of Subcorticol Structures for Surgical Guidance in Image Guided Stereotactic Neurosurgery," Medical Image Computing and Computer-Assisted Intervention—MICCAI'99, Second International Conference. Cambridge, UK, Sep. 19-22, 1999, Proceedings (1999), pp. 758-767.
Finnis, K. W., et al., "A 3-Dimensional Database of Deep Brain Functional Anatomy, and Its Application to Image-Guided Neurosurgery," Proceedings of the Third International Conference on Medical Image Computing and Computer-Assisted Intervention. Lecture Notes in Computer Science; vol. 1935 (2000), pp. 1-8.
Finnis, K. W., et al., "A functional database for guidance of surgical and therapeutic procedures in the deep brain," Proceedings of the 22nd Annual International Conference of the IEEE Engineering in Medicine and Biology Society, vol. 3 (2000), pp. 1787-1789.
Finnis, K. W., et al., "Application of a Population Based Electrophysiological Database to the Planning and Guidance of Deep Brain Stereotactic Neurosurgery," Proceedings of the 5th International Conference on Medical Image Computing and Computer-Assisted Intervention—Part 11, Lecture Notes In Computer Science; vol. 2489 (2002), pp. 69-76.
Finnis, K. W., et al., "Subcortical physiology deformed into a patient-specific brain atlas for image-guided stereotaxy," Proceedings of SPIE—vol. 4681 Medical Imaging 2002: Visualization, Image-Guided Procedures, and Display (May 2002), pp. 184-195.
Finnis, Krik W., et al., "Three-Dimensional Database of Subcortical Electrophysiology for Image-Guided Stereotatic Functional Neurosurgery," IEEE Transactions on Medical Imaging, 22(1) (Jan. 2003), pp. 93-104.
Gabriels, L , et al., "Deep brain stimulation for treatment-refractory obsessive-compulsive disorder: psychopathological and neuropsychological outcome in three cases," Acta Psychiatr Scand., 107(4) (2003), pp. 275-282.
Gabriels, LA., et al., "Long-term electrical capsular stimulation in patients with obsessive-compulsive disorder," Neurosurgery, 52(6) (Jun. 2003), pp. 1263-1276.
Goodall, E. V., et al., "Modeling study of activation and propagation delays during stimulation of peripheral nerve fibers with a tripolar cuff electrode," IEEE Transactions on Rehabilitation Engineering, [see also IEEE Trans. on Neural Systems and Rehabilitation], 3(3) (Sep. 1995), pp. 272-282.
Goodall, E. V., et al., "Position-selective activation of peripheral nerve fibers with a cuff electrode," IEEE Transactions on Biomedical Engineering, 43(8) (Aug. 1996), pp. 851-856.
Goodall, E. V., "Simulation of activation and propagation delay during tripolar neural stimulation," Proceedings of the 15th Annual International Conference of the IEEE Engineering in Medicine and Biology Society (1993), pp. 1203-1204.
Grill, WM., "Modeling the effects of electric fields on nerve fibers: influence of tissue electrical properties," IEEE Transactions on Biomedical Engineering, 46(8) (1999), pp. 918-928.
Grill, W. M., et al., "Neural and connective tissue response to long-term implantation of multiple contact nerve cuff electrodes," J Biomed Mater Res., 50(2) (May 2000), pp. 215-226.
Grill, W. M., "Neural modeling in neuromuscular and rehabilitation research," Proceedings of the 23rd Annual International Conference of the IEEE Engineering in Medicine and Biology Society, vol. 4 (2001 ), pp. 4065-4068.
Grill, W. M., et al., "Non-invasive measurement of the input-output properties of peripheral nerve stimulating electrodes," Journal of Neuroscience Methods, 65(1) (Mar. 1996), pp. 43-50.
Grill, W. M., et al., "Quantification of recruitment properties of multiple contact cuff electrodes," IEEE Transactions on Rehabilitation Engineering, [see also IEEE Trans. on Neural Systems and Rehabilitation], 4(2) (Jun. 1996), pp. 49-62.
Grill, W. M., "Spatially selective activation of peripheral nerve for neuroprosthetic applications," Ph.D. Case Western Reserve University, (1995), pp. 245 pages.
Grill, W. M., "Stability of the input-output properties of chronically implanted multiple contact nerve cuff stimulating electrodes," IEEE Transactions on Rehabilitation Engineering [see also IEEE Trans. on Neural Systems and Rehabilitation] (1998), pp. 364-373.
Grill, W. M., et al., "Deep brain stimulation creates an informational lesion of the stimulated nucleus", Neuroreport. 1517t (May 19, 2004 ), 1137-40.
Grill, W. M., et al., "Temporal stability of nerve cuff electrode recruitment properties," IEEE 17th Annual Conference Engineering in Medicine and Biology Society, vol. 2 (1995), pp. 1089-1090.
Gross, RE., et al., "Advances in neurostimulation for movement disorders," Neurol Res., 22(3) (Apr. 2000), pp. 247-258.
Guridi et al., "The subthalamic nucleus, hemiballismus and Parkinson's disease: reappraisal of a neurological dogma," Brain, vol. 124, 2001, pp. 5-19.
Haberler, C, et al., "No. tissue damage by chronic deep brain stimulation in Parkinson's disease," Ann Neurol., 48(3) (Sep. 2000), pp. 372-376.
Hamel, W, et al., "Deep brain stimulation of the subthalamic nucleus in Parkinson's disease: evaluation of active electrode contacts," J Neurol Neurosurg Psychiatry, 74(8) (Aug. 2003), pp. 1036-1046.
Hanekom, "Modelling encapsulation tissue around cochlear implant electrodes," Med. Biol. Eng. Comput. vol. 43 (2005), pp. 47-55.
Haueisen, J , et al., "The influence of brain tissue anisotropy on human EEG and MEG," Neuroimage, 15(1) (Jan. 2002), pp. 159-166.
D'Haese et al. Medical Image Computing and Computer-Assisted Intervention—MICCAI 2005 Lecture Notes in Computer Science, 2005, vol. 3750, 2005, 427-434.
Rohde et al. IEEE Transactions on Medical Imaging, vol. 22 No. 11, 2003 p. 1470-1479.
Dawant et al., Biomedical Image Registration. Lecture Notes in Computer Science, 2003, vol. 2717, 2003, 142-150.
Miocinovic et al., "Stereotactiv Neurosurgical Planning, Recording, and Visualization for Deep Brain Stimulation in Non-Human Primates", Journal of Neuroscience Methods, 162:32-41, Apr. 5, 2007, XP022021469.
Gemmar et al., "Advanced Methods for Target Navigation Using Microelectrode Recordings in Stereotactic Neurosurgery for Deep Brain Stimulation", 21st IEEE International Symposium on Computer-Based Medical Systems, Jun. 17, 2008, pp. 99-104, XP031284774.
Acar et al., "Safety Anterior Commissure-Posterior Commissure-Based Target Calculation of the Subthalamic Nucleus In Functional Stereotactic Procedures", Stereotactic Funct. Neurosura., 85:287-291, Aug. 2007.
Andrade-Souza, "Comparison of Three Methods of Targeting the Subthalamic Nucleus for Chronic Stimulation in Parkinson's Disease", Neurosurgery, 56:360-368, Apr. 2005.
Anheim et al., "Improvement in Parkinson Disease by Subthalamic Nucleus Stimulation Based on Electrode Placement", Arch Neural., 65:612-616, May 2008.
Zhang, Y., et al., "Atlas-guided tract reconstruction for automated and comprehensive examination of the white matter anatomy," Neuroimage 52(4) (2010), pp. 1289-1301.
""BioPSE" The Biomedical Problem Solving Environment", htt12://www.sci.utah.edu/cibc/software/index.html, MCRR Center for Integrative Biomedical Computing, (2004).
Andrews, R. J., "Neuroprotection trek—the next generation: neuromodulation I. Techniques—deep brain stimulation, vagus nerve stimulation, and transcranial magnetic stimulation.", Ann NY Acad Sci. 993. (May 2003), 1-13.
Carnevale, N.T. et al., "The Neuron Book," Cambridge, UK: Cambridge University Press (2006), 480 pages.
Chaturvedi: "Development of Accurate Computational Models for Patient-Specific Deep Brain Stimulation," Electronic Thesis or Dissertation, Jan. 2012, 162 pages.

(56) References Cited

OTHER PUBLICATIONS

Chaturvedi, A. et al.: "Patient-specific models of deep brain stimulation: Influence of field model complexity on neural activation predictions." Brain Stimulation, Elsevier, Amsterdam, NL, vol. 3, No. Apr. 2, 2010, pp. 65-77.
Frankemolle, et al., "Reversing cognitive-motor impairments in Parkinson's disease patients using a computational modeling approach to deep brain stimulation programming," Brian 133 (2010), pp. 746-761.
McIntyre, C.C., et al., "Modeling the excitablitity of mammalian nerve fibers: influence of afterpotentials on the recovery cycle," J Neurophysiol, 87(2) (Feb. 2002), pp. 995-1006.
Peterson, et al., "Predicting myelinated axon activation using spatial characteristics of the extracellular field," Journal of Neural Engineering, 8 (2011), 12 pages.
Warman, et al., "Modeling the Effects of Electric Fields on nerver Fibers; Dermination of Excitation Thresholds, " IEEE Transactions on Biomedical Engineering, vol. 39, No. 12 (Dec. 1992), pp. 1244-1254.
Wesselink, et al., "Analysis of Current Density and Related Parameters in Spinal Cord Stimulation," IEEE Transactions on Rehabilitation Engineering, vol. 6, No. Jun. 2, 1998, pp. 200-207.
Andrews, R. J., "Neuroprotection trek—the next generation: neuromodulation II. Applications—epilepsy, nerve regeneration, neurotrophins.", Ann NY Acad Sci. 993 (May 2003), 14-24.
Astrom, M. , et al., "The effect of cystic cavities on deep brain stimulation in the basal ganglia: a simulation-based study", J Neural Eng., 3(2), (Jun. 2006), 12-8.
Bazin et al., "Free Software Tools for Atlas-based Volumetric Neuroimage Analysis", Proc. SPIE 5747, Medical Imaging 2005: Image Processing, 1824 May 5, 2005.
Back, C. , et al., "Postoperative Monitoring of the Electrical Properties of Tissue and Electrodes in Deep Brain Stimulation", Neuromodulation, 6(4), (Oct. 2003 ),248-253.
Baker, K. B., et al., "Evaluation of specific absorption rate as a dosimeter of MRI-related implant heating", J Magn Reson Imaging., 20(2), (Aug. 2004),315-20.
Brown, J. "Motor Cortex Stimulation," Neurosurgical Focus ( Sep. 15, 2001) 11(3):E5.
Budai et al., "Endogenous Opioid Peptides Acting at m-Opioid Receptors in the Dorsal Horn Contribute to Midbrain Modulation of Spinal Nociceptive Neurons," Journal of Neurophysiology (1998) 79(2): 677-687.
Cesselin, F. "Opioid and anti-opioid peptides," Fundamental and Clinical Pharmacology (1995) 9(5): 409-33 (Abstract only).
Rezai et al., "Deep Brain Stimulation for Chronic Pain" Surgical Management of Pain, Chapter 44 pp. 565-576 (2002).
Xu, MD., Shi-Ang, article entitled "Comparison of Half-Band and Full-Band Electrodes for Intracochlear Electrical Stimulation", Annals of Otology, Rhinology & Laryngology (Annals of Head & Neck Medicine & Surgery), vol. 102 (5) pp. 363-367 May 1993.
Bedard, C. , et al., "Modeling extracellular field potentials and the frequency-filtering properties of extracellular space", Biophys J . . . 86(3). (Mar. 2004), 1829-42.
Benabid, A. L., et al., "Future prospects of brain stimulation", Neurol Res.,22(3), (Apr. 2000), 237-46.
Brummer, S. B., et al., "Electrical Stimulation with Pt Electrodes: II—Estimation of Maximum Surface Redox (Theoretical Non-Gassing) Limits", IEEE Transactions on Biomedical Engineering, vol. BME-24, Issue 5, (Sep. 1977),440-443.
Butson, Christopher R., et al., "Deep Brain Stimulation of the Subthalamic Nucleus: Model-Based Analysis of the Effects of Electrode Capacitance on the Volume of Activation", Proceedings of the 2nd International IEEE EMBS, (Mar. 16-19, 2005), 196-197.
Mcintyre, Cameron C., et al., "Cellular effects of deep brain stimulation: model-based analysis of activation and Inhibition," J Neurophysiol, 91(4) (Apr. 2004), pp. 1457-1469.
Chaturvedi, A., et al., "Subthalamic Nucleus Deep Brain Stimulation: Accurate Axonal Threshold Prediction with Diffusion Tensor Based Electric Field Models", Engineering in Medicine and Biology Society, 2006. EMBS' 06 28th Annual International Conference of the IEEE, IEEE, Piscataway, NJ USA, Aug. 30, 2006.
Butson, Christopher et al., "Predicting the Effects of Deep Brain Stimulation with Diffusion Tensor Based Electric Field Models" Jan. 1, 2001, Medical Image Computing and Computer-Assisted Intervention-Mic CAI 2006 Lecture Notes In Computer Science; LNCS, Springer, Berlin, DE.
Butson, C. R., et al., "Deep brainstimulation interactive visualization system", Society for Neuroscience vol. 898.7 (2005).
Hodaie, M., et al., "Chronic anterior thalamus stimulation for intractable epilepsy," Epilepsia, 43(6) (Jun. 2002), pp. 603-608.
Hoekema, R., et al., "Multigrid solution of the potential field in modeling electrical nerve stimulation," Comput Biomed Res., 31(5) (Oct. 1998), pp. 348-362.
Holsheimer, J., et al., "Identification of the target neuronal elements in electrical deep brain stimulation," Eur J Neurosci., 12(12) (Dec. 2000), pp. 4573-4577.
Jezernik, S., et al., "Neural network classification of nerve activity recorded in a mixed nerve," Neurol Res., 23(5) (Jul. 2001), pp. 429-434.
Jones, DK., et al., "Optimal strategies for measuring diffusion in anisotropic systems by magnetic resonance imaging," Magn. Reson. Med., 42(3) (Sep. 1999), pp. 515-525.
Krack, P., et al., "Postoperative management of subthalamic nucleus stimulation for Parkinson's disease," Mov. Disord., vol. 17(suppl 3) (2002), pp. 188-197.
Le Bihan, D., et al., "Diffusion tensor imaging: concepts and applications," J Magn Reson Imaging, 13(4) (Apr. 2001), pp. 534-546.
Lee, D. C., et al., "Extracellular electrical stimulation of central neurons: quantitative studies," In: Handbook of neuroprosthetic methods, WE Finn and PG Lopresti (eds) CRC Press (2003), pp. 95-125.
Levy, AL., et al., "An Internet-connected, patient-specific, deformable brain atlas integrated into a surgical navigation system," J Digit Imaging, 10(3 Suppl 1) (Aug. 1997), pp. 231-237.
Liu, Haiying, et al., "Intra-operative MR-guided DBS implantation for treating PD and ET," Proceedings of SPIE vol. 4319, Department of Radiology & Neurosurgery, University of Minnesota, Minneapolis, MN 55455 (2001), pp. 272-276.
Mcintyre, C. C., et al., "Extracellular stimulation of central neurons: influence of stimulus waveform and frequency on neuronal output," J. Neurophysiol., 88(4), (Oct. 2002), pp. 1592-1604.
Mcintyre, C. C., et al., "Microstimulation of spinal motoneurons: a model study," Proceedings of the 19th Annual International Conference of the IEEE Engineering in Medicine and Biology society, vol. 5, (1997), pp. 2032-2034.
Mcintyre, Cameron C., et al., "Model-based Analysis of deep brain stimulation of the thalamus," Proceedings of the Second joint EMBS/BM ES Conference, vol. 3, Annual Fall Meeting of the Biomedical Engineering Society (Cal. No. 02CH37392) IEEEPiscataway, NJ (2002), pp. 2047-2048.
Mcintyre, C. C., et al., "Model-based design of stimulus trains for selective microstimulation of targeted neuronal populations," Proceedings of the 23rd Annual International Conference of the IEEE Engineering in Medicine and Biology Society, vol. 1 (2001), pp. 806-809.
Mcintyre, C. C., et al., Model-based design of stimulus waveforms for selective microstimulation in the central nervous system,, Proceedings of the First Joint [Engineering in Medicine and Biology, 1999. 21st Annual Conf. and the 1999 Annual FallMeeting of the Biomedical Engineering Soc.] BM ES/EMBS Conference, vol. 1 (1999), p. 384.
Mcintyre, Cameron C., et al., "Modeling the excitability of mammalian nerve fibers: influence of aflerpotentials on the recovery cycle," J Neurophysiol, 87(2) (Feb. 2002), pp. 995-1006.
Mcintyre, Cameron C., et al., "Selective microstimulation of central nervous system neurons," Annals of biomedical engineering, 28(3) (Mar. 2000), pp. 219-233.
Mcintyre, C. C., et al., "Sensitivity analysis of a model of mammalian neural membrane," Biol Cybern., 79(1) (Jul. 1998), pp. 29-37.

(56) References Cited

OTHER PUBLICATIONS

Mcintyre, Cameron C., et al., "Uncovering the mechanism(s) of action of deep brain stimulation: activation, inhibition, or both," Clin Neurophysiol, 115(6) (Jun. 2004), pp. 1239-1248.

Mcintyre, Cameron C., et al., "Uncovering the mechanisms of deep brain stimulation for Parkinson's disease through functional imaging, neural recording, and neural modeling," Crit Rev Biomed Eng., 30(4-6) (2002), pp. 249-281.

Mouine et al. "Multi-Strategy and Multi-Algorithm Cochlear Prostheses", Biomed. Sci. Instrument, 2000; 36:233-238.

Mcintyre, Cameron C., et al., "Electric Field and Stimulating Influence generated by Deep Brain Stimulation of the Subthalamaic Nucleus," Clinical Neurophysiology, 115(3) (Mar. 2004), pp. 589-595.

Mcintyre, Cameron C., et al., "Electric field generated by deep brain stimulation of the subthalamic nucleus," Biomedical Engineering Society Annual Meeting, Nashville TN (Oct. 2003), 16 pages.

Mcintyre, Cameron C., et al., "Excitation of central nervous system neurons by nonuniform electric fields," Biophys. J., 76(2) (1999), pp. 878-888.

McNeal, DR., et al., "Analysis of a model for excitation of myelinated nerve," IEEE Trans Biomed Eng., vol. 23 (1976), pp. 329-337.

McNaughtan et al., "Electrochemical Issues in Impedance Tomography", 1st World Congress on Industrial Process Tomography, Buxton, Greater Manchester, Apr. 14-17, 1999.

Miocinovic, S., et al., "Computational analysis of subthalamic nucleus and lenticular fasciculus activation during therapeutic deep brain stimulation," J Neurophysiol., 96(3) (Sep. 2006), pp. 1569-1580.

Miranda, P. C., et al., "The distribution of currents inducedin the brain by Magnetic Stimulation: a finite element analysis incorporating OT-MRI-derived conductivity data," Proc. Intl. Soc. Mag. Reson. Med. 9 (2001 ), p. 1540.

Miranda, P. C., et al., "The Electric Field Induced in the Brain by Magnetic Stimulation: A 3-D Finite-Element Analysis of the Effect of Tissue Heterogeneity and Anisotropy," IEEE Transactions on Biomedical Enginering, 50(9) (Sep. 2003), pp. 1074-1085.

Moffitt, MA., et al., "Prediction of myelinated nerve fiber stimulation thresholds: limitations of linear models," IEEE Transactions on Biomedical Engineering, 51 (2) (2003), pp. 229-236.

Moro, E, et al., "The impact on Parkinson's disease of electrical parameter settings in STN stimulation," Neurology, 59 (5) (Sep. 10, 2002), pp. 706-713.

Nowak, LG., et al., "Axons, but not cell bodies, are activated by electrical stimulation in cortical gray matter. I. Evidence from chronaxie measurements," Exp. Brain Res., 118(4) (Feb. 1998), pp. 477-488.

Nowak, LG., et al., "Axons, but not cell bodies, are activated by electrical stimulation in cortical gray matter. II. Evidence from selective inactivation of cell bodies and axon initial segments," Exp. Brain Res., 118(4) (Feb. 1998), pp. 489-500.

O'Suilleabhain, PE., et al., "Tremor response to polarity, voltage, pulsewidth and frequency of thalamic stimulation," Neurology, 60(5) (Mar. 11, 2003), pp. 786-790.

Pierpaoli, C., et al., "Toward a quantitative assessment of diffusion anisotropy," Magn Reson Med., 36(6) (Dec. 1996), pp. 893-906.

Plonsey, R., et al., "Considerations of quasi-stationarity in electrophysiological systems, " Bull Math Biophys., 29(4) (Dec. 1967), pp. 657-664.

Ranck, J B., "Specific impedance of rabbit cerebral cortex," Exp. Neurol., vol. 7 (Feb. 1963), pp. 144-152.

Ranck, J B., et al., "The Specific impedance of the dorsal cols. of the cat: an anisotropic medium," Exp. Neurol., 11 (Apr. 1965), pp. 451-463.

Ranck, J B., "Which elements are excited in electrical stimulation of mammalian central nervous system: a review," Brain Res., 98(3) (Nov. 21, 1975), pp. 417-440.

Rattay, F., et al., "A model of the electrically excited human cochlear neuron. I. Contribution of neural substructures to the generation and propagation of spikes," Hear Res., 153(1-2) (Mar. 2001), pp. 43-63.

Rattay, F., "A model of the electrically excited human cochlear neuron. II Influence of the three-dimensional cochlear structure on neural excitability," Hear Res., 153(1-2) (Mar. 2001), pp. 64-79.

Rattay, F., "Arrival at Functional Electrostimulation by modelling of fiber excitation," Proceedings of the Ninth annual Conference of the IEEE Engineering in Medicine and Biology Society (1987), pp. 1459-1460.

Rattay, F., "The influence of intrinsic noise can preserve the temporal fine structure of speech signals in models of electrically stimulated human cochlear neurones," Journal of Physiology, Scientific Meeting of the Physiological Society, London, England, UK Apr. 19-21, 1999 (Jul. 1999), p. 170P.

Rizzone, M., et al., "Deep brain stimulation of the subthalamic nucleus in Parkinson's disease: effects of variation in stimulation parameters," J. Neurol. Neurosurg. Psychiatry., 71(2) (Aug. 2001), pp. 215-219.

Saint-Cyr, J. A., et al., "Localization of clinically effective stimulating electrodes in the human subthalamic nucleus on magnetic resonance imaging," J. Neurosurg., 87(5) (Nov. 2002), pp. 1152-1166.

Sances, A., et al., "In Electroanesthesia: Biomedical and Biophysical Studies," A Sances and SJ Larson, Eds., Academic Press, NY (1975), pp. 114-124.

SI. Jean, P., et al., "Automated atlas integration and interactive three-dimensional visualization tools for planning and guidance in functional neurosurgery," IEEE Transactions on Medical Imaging, 17(5) (1998), pp. 672-680.

Starr, P.A., et al., "Implantation of deep brain stimulators into the subthalamic nucleus: technical approach and magnetic resonance imaging-verified lead locations," J. Neurosurg., 97(2) (Aug. 2002), pp. 370-387.

Sterio, D., et al., "Neurophysiological refinement of subthalamic nucleus targeting," Neurosurgery, 50(1) (Jan. 2002), pp. 58-69.

Struijk, J. J., et al., "Excitation of dorsal root fibers in spinal cord stimulation: a theoretical study," IEEE Transactions on Biomedical Engineering, 40(7) (Jul. 1993), pp. 632-639.

Struijk, J J., et al., "Recruitment of dorsal column fibers in spinal cord stimulation: influence of collateral branching," IEEE Transactions on Biomedical Engineering, 39(9) (Sep. 1992), pp. 903-912.

Tamma, F., et al., "Anatomo-clinical correlation of intraoperative stimulation-induced side effects during HF-DBS of the subthalamic nucleus," Neurol Sci., vol. 23 (Suppl 2) (2002), pp. 109-110.

Tarler, M., et al., "Comparison between monopolar and tripolar configurations in chronically implanted nerve cuff electrodes," IEEE 17th Annual Conference Engineering in Medicine and Biology Society, vol. 2 (1995), pp. 1093-1109.

Testerman, Roy L., "Coritical response to callosal stimulation: A model for determining safe and efficient stimulus parameters," Annals of Biomedical Engineering, 6(4) (1978), pp. 438-452.

Tuch, D.S., et al., "Conductivity mapping of biological tissue using diffusion MRI," Ann NY Acad Sci., 888 (Oct. 30, 1999), pp. 314-316.

Tuch, D.S., et al., "Conductivity tensor mapping of the human brain using diffusion tensor MRI," Proc Nall Acad Sci USA, 98(20) (Sep. 25, 2001), pp. 11697-11701.

Veraart, C., et al., "Selective control of muscle activation with a multipolar nerve cuff electrode," IEEE Transactions on Biomedical Engineering, 40(7) (Jul. 1993), pp. 640-653.

Vercueil, L., et al., "Deep brain stimulation in the treatment of severe dystonia," J. Neurol., 248(8) (Aug. 2001 ), pp. 695-700.

Vilalte, "Circuit Design of the Power-on-Reset," Apr. 2000, pp. 1-25.

Vitek, J. L., "Mechanisms of deep brain stimulation: excitation or inhibition," Mov. Disord., vol. 17 (Suppl. 3) (2002), pp. 69-72.

Voges, J., et al., "Bilateral high-frequency stimulation in the subthalamic nucleus for the treatment of Parkinson disease: correlation of therapeutic effect with anatomical electrode position," J. Neurosurg., 96(2) (Feb. 2002), pp. 269-279.

(56) References Cited

OTHER PUBLICATIONS

Wakana, S., et al., "Fiber tract-based atlas of human white matter anatomy," Radiology, 230(1) (Jan. 2004), pp. 77-87.

Alexander, DC., et al., "Spatial transformations of diffusion tensor magnetic resonance images," IEEE Transactions on Medical Imaging, 20 (11), (2001), pp. 1131-1139.

Wu, Y. R., et al., "Does Stimulation of the GPi control dyskinesia by activating inhibitory axons?," Mov. Disord., vol. 16 (2001), pp. 208-216.

Yelnik, J., et al., "Localization of stimulating electrodes in patients with Parkinson disease by using a three-dimensional atlas-magnetic resonance imaging coregistration method," J Neurosurg., 99(1) (Jul. 2003), pp. 89-99.

Yianni, John, et al., "Globus pallidus internus deep brain stimulation for dystonic conditions: a prospective audit," Mov. Disord., vol. 18 (2003), pp. 436-442.

Zonenshayn, M., et al., "Comparison of anatomic and neurophysiological methods for subthalamic nucleus targeting," Neurosurgery, 47(2) (Aug. 2000), pp. 282-294.

Voghell et al., "Programmable Current Source Dedicated to Implantable Microstimulators" ICM '98 Proceedings of the Tenth International Conference, pp. 67-70.

Butson, Christopher R., et al., "Patient-specific analysis of the volume of tissue activated during deep brain stimulation", NeuroImage. Vol. 34. (2007),661-670.

Adler, DE., et al., "The tentorial notch: anatomical variation, morphometric analysis, and classification in 100 human autopsy cases," J. Neurosurg., 96(6), (Jun. 2002), pp. 1103-1112.

Jones et al., "An Advanced Demultiplexing System for Physiological Stimulation", IEEE Transactions on Biomedical Engineering, vol. 44 No. Dec. 12, 1997, pp. 1210-1220.

International Search Report and Written Opinion for PCT Application No. PCT/US2022/051966 mailed Apr. 3, 2023.

Mitra PP, Pesaran B. Analysis of dynamic brain imaging data. Biophys J. Feb. 1999;76(2):691-708. doi: 10.1016/S0006-3495(99)77236-X. PMID: 9929474; PMCID: PMC1300074.

Hammer N, Glätzner J, Feja C, Kühne C, Meixensberger J, et al. (2015) Human Vagus Nerve Branching in the Cervical Region. Plos One 10(2): e0118006. Published: Feb. 13, 2015. https://doi.org/10.1371/journal.pone.0118006.

Nowinski, W. L., et al., "Statistical analysis of 168 bilateral subthalamic nucleus implantations by means of the probabilistic functional atlas.", Neurosurgery 57(4 Suppl) (Oct. 2005), 319-30.

Obeso, J. A., et al., "Deep-brain stimulation of the subthalamic nucleus or the pars interna of the globus pallidus in Parkinson's disease.", N Engl J Med., 345{13I. The Deep-Brain Stimulation for Parkinson's Disease Study Group, (Sep. 27, 2001 ), 956-63.

Butson et al.. "Current Steering to control the vol. of tissue activated during deep brain stimulation," vol. 1, No. 1, Dec. 3, 2007, pp. 7-15.

Patrick, S. K., et al., "Quantification of the UPDRS rigidity scale", IEEE Transactions on Neural Systems and Rehabilitation Engineering, [see also IEEE Trans. on Rehabilitation Engineering 9(1). (2001), 31-41.

Phillips, M. D., et al., "Parkinson disease: pattern of functional MR imaging activation during deep brain stimulation of subthalamic nucleus-initial experience", Radiology 239(1). (Apr. 2006), 209-16.

Ericsson, A. et al., "Construction of a patient-specific atlas of the brain: Application to normal aging," Biomedical Imaging: From Nano to Macro, ISBI 2008, 5th IEEE International Symposium, May 14, 2008, pp. 480-483.

Kaikai Shen et al., "Atlas selection strategy using least angle regression in multi-atlas segmentation propagation," Biomedical Imaging: From Nano to Macro, 2011, 8th IEEE International Symposium, ISBI 2011, Mar. 30, 2011, pp. 1746-1749.

Liliane Ramus et al., "Assessing selection methods in the cotnext of multi-atlas based segmentation," Biomedical Imaging: From Nano to Macro, 2010, IEEE International Symposium, Apr. 14, 2010, pp. 1321-1324.

Olivier Commowick et al., "Using Frankenstein's Creature Paradigm to Build a Patient Specific Atlas," Sep. 20, 2009, Medical Image Computing and Computer-Assisted Intervention, pp. 993-1000.

Lotjonen J.M.P. et al., "Fast and robust multi-atlas segmentation of brain magnetic resonance images," NeuroImage, Academic Press, vol. 49, No. 3, Feb. 1, 2010, pp. 2352-2365.

Mcintyre, C. C., et al., "How does deep brain stimulation work? Present understanding and future questions.", J Clin Neurophysiol. 21 (1 ). (Jan.-Feb. 2004 ), 40-50.

Sanchez Castro et al., "A cross validation study of deep brain stimulation targeting: From experts to Atlas-Based, Segmentation-Based and Automatic Registration Algorithms," IEEE Transactions on Medical Imaging, vol. 25, No. 11, Nov. 1, 2006, pp. 1440-1450.

Plaha, P., et al., "Stimulation of the caudal zona incerta is superior to stimulation of the subthalamic nucleus in Improving contralateral parkinsonism.", Brain 129{Pt 7) (Jul. 2006), 1732-4 7.

Rattay, F, "Analysis of models for external stimulation of axons", IEEE Trans. Biomed. Eng. vol. 33 (1986), 974-977.

Rattay, F., "Analysis of the electrical excitation of CNS neurons", IEEE Transactions on Biomedical Engineering 45 (6). (Jun. 1998), 766-772.

Rose, T. L., et al., "Electrical stimulation with Pt electrodes. VIII. Electrochemically safe charge injection limits with 0.2 ms pulses [neuronal application]", IEEE Transactions on Biomedical Engineering, 37(11 }, (Nov. 1990), 1118-1120.

Rubinstein, J. T., et al., "Signal coding in cochlear implants: exploiting stochastic effects of electrical stimulation", Ann Otol Rhinol Laryngol Suppl . . . 191, (Sep. 2003), 14-9.

Schwan, H.P., et al., "The conductivity of living tissues.", Ann NY Acad Sci., 65(6). (AUQ., 1957), 1007-13.

Taylor, R. S., et al., "Spinal cord stimulation for chronic back and leg pain and failed back surgery syndrome: a systematic review and analysis of prognostic factors", Spine 30(1 ). (Jan. 1, 2005), 152-60.

Siegel, Ralph M. et al., "Spatiotemporal dynamics of the functional architecture for gain fields in inferior parietal lobule of behaving monkey," Cerebral Cortex, New York, NY, vol. 17, No. 2, Feb. 2007, pp. 378-390.

Klein, A. et al., "Evaluation of 14 nonlinear deformation algorithms applied to human brain MRI registration," NeuroImage, Academic Press, Orlando, FL, vol. 46, No. 3, Jul. 2009, pp. 786-802.

Geddes, L. A., et al., "The specific resistance of biological material—a compendium of data for the biomedical engineer and physiologist.", Med Biol Ena. 5(3). (May 1967), 271-93.

Gimsa, J., et al., "Choosing electrodes for deep brain stimulation experiments-electrochemical considerations.", J Neurosci Methods, 142(2), (Mar. 30, 2005), 251-65.

Vidailhet, M., et al., "Bilateral deep-brain stimulation of the globus pallidus in primary generalized dystonia", N Engl J Med. 352(5) (Feb. 3, 2005),459-67.

Izad, Oliver, "Computationally Efficient Method in Predicating Axonal Excitation," Dissertation for Master Degree, Department of Biomedical Engineering, Case Western Reserve University, May 2009.

Jaccard, Paul, "Elude comparative de la distribution florale dans une portion odes Aples et des Jura," Bulletin de la Societe Vaudoise des Sciences Naturelles (1901), 37:547-579.

Dice, Lee R., "Measures of the Amount of Ecologic Association Between Species," Ecology 26(3) (1945): 297-302. doi: 10.2307/1932409, http://jstor.org/stable/1932409.

Rand, WM., "Objective criteria for the evaluation of clustering methods," Journal of the American Statistical Association (American Statistical Association) 66 (336) (1971 ): 846-850, doi:10.2307/2284239, http://jstor.org/stable/2284239.

Hubert, Lawrence et al., "Comparing partitions," Journal of Classification 2(1) (1985): 193-218, doi:10.1007/BF01908075.

Cover, T.M. et al., "Elements of information theory," (1991) John Wiley & Sons, New York, NY.

Meila, Marina, "Comparing Clusterings by the Variation of Information," Learning Theory and Kernel Machines (2003): 173-187.

Viola, P., et al., "Alignment by maximization of mutual information", International Journal of Com outer Vision 24(2). ( 1997), 137-154.

(56) References Cited

OTHER PUBLICATIONS

Butson et al. "StimExplorer: Deep Brain Stimulation Parameter Selection Software System," Acta Neurochirugica, Jan. 1, 2007, vol. 97, No. 2, pp. 569-574.
Butson et al. "Role of Electrode Design on the Volume of Tissue Activated During Deep Brain Stimulation," Journal of Neural Engineering, Mar. 1, 2006, vol. 3, No. 1, pp. 1-8.
Volkmann et al., Indroduction to the Programming of Deep Brain Stimulators, Movement Disorders, vol. 17, Suppl. 3, pp. S181-S187 (2002).
Miocinovic et al. "Cicerone: Stereotactic Neurophysiological Recording and Deep Brain Stimulation Electrode Placement Software System," Acta Neurochirurgica Suppl., Jan. 1, 2007, vol. 97, No. 2, pp. 561-567.
Schmidt et al. "Sketching and Composing Widgets for 3D Manipulation," Eurographics, Apr. 2008, vol. 27, No. 2, pp. 301-310.
Volkmann, J., et al., "Basic algorithms for the programming of deep brain stimulation in Parkinson's disease", Mov Disord., 21 Suppl 14. (Jun. 2006), S284-9.
Walter, B. L., et al., "Surgical treatment for Parkinson's disease", Lancet Neural. 3(12). (Dec. 2004), 719-28.
Wei, X. F., et al., "Current density distributions, field distributions and impedance analysis of segmented deep brain stimulation electrodes", J Neural Eng . . . 2(4). (Dec. 2005), 139-47.
Zonenshayn, M., et al., "Location of the active contact within the subthalamic nucleus (STN) in the treatment of diopathic Parkinson's disease.", Surg Neurol., 62(3) (Sep. 2004), 216-25.
Da Silva et al (A primer on diffusion tensor imaging of anatomical substructures. Neurosurg Focus 15(1): p. 1-4, Article 4, 2003.).
Micheli-Tzanakou, E., et al., "Computational Intelligence for target assesment in Parkinson's disease", Proceedings of SPIE vol. 4479. Applications and Science of Neural Networks, Fuzzy Systems, and Evolutionary Computation IV,(2001),54-69.
Grill, W. M., "Stimulus waveforms for selective neural stimulation", IEEE Engineering in Medicine and Biology Magazine, 14(4), (Jul.-Aug. 1995), 375-385.
Miocinovic, S., et al., "Sensitivity of temporal excitation properties to the neuronal element activated by extracellular stimulation", J Neurosci Methods. 132(1). (Jan. 15, 2004), 91-9.
Hunka, K. et al., Nursing Time to Program and Assess Deep Brain Stimulators in Movement Disorder Patients, J. Neursci Nurs., 37: 204-10 (Aug. 2005).
Moss, J., et al., "Electron microscopy of tissue adherent to explanted electrodes in dystonia and Parkinson's disease", Brain, 127{Pt 12). (Dec. 2004 ), 2755-63.
Montgomery, E. B., et al., "Mechanisms of deep brain stimulation and future technical developments.", Neurol Res. 22(3). (Apr. 2000),259-66.
Merrill, D. R., et al., "Electrical stimulation of excitable tissue: design of efficacious and safe protocols", J Neurosci Methods. 141(2), (Feb. 15, 2005), 171-98.
Fisekovic et al., "New Controller for Functional Electrical Stimulation Systems", Med. Eng. Phys. 2001; 23:391-399.
Butson et al., "Tissue and Electrode Capacitance Reduce Neural Activation Volumes During Deep Brain Stimulation", Clinical Neurophysiology, 116:2490-2500, Oct. 2005.
Butson et al., "Sources and Effects of Electrode Impedance During Deep Brain Stimulation", Clinical Neurophysiology, 117:44 7-454, Dec. 2005.
D'Haese et al., "Computer-Aided Placement of Deep Brain Stimulators: From Planning to Intraoperative Guidance", IEEE Transaction on Medical Imaging, 24:1469-1478, Nov. 2005.
Gross et al., "Electrophysiological Mapping for the Implantation of Deep Brain Stimulators for Parkinson's Disease and Tremor", Movement Disorders, 21 :S259-S283, Jun. 2006.
Halpern et al., "Brain Shift During Deep Brain Stimulation Surgery for Parkinson's Disease", Stereotact Funct. Neurosurg., 86:37-43, published online Sep. 2007.
Herzog et al., "Most Effective Stimulation Site in Subthalamic Deep Brain Stimulation for Parkinson's Disease", Movement Disorders, 19:1050-1099, published on line Mar. 2004.
Jeon et al., A Feasibility Study of Optical Coherence Tomography for Guiding Deep Brain Probes, Journal of Neuroscience Methods, 154:96-101, Jun. 2006.
Khan et al., "Assessment of Brain Shift Related to Deep Brain Stimulation Surgery", Sterreotact Funct. Neurosurg., 36:44-53, published online Sep. 2007.
Koop et al., "Improvement in a Quantitative Measure of Bradykinesia After Microelectrode Recording in Patients with Parkinson's Disease During Deep Brain Stimulation Surgery", Movement Disorders, 21 :673-678, published on line Jan. 2006.
Lemaire et al., "Brain Mapping in Stereotactic Surgery: A Brief Overview from the Probabilistic Targeting to the Patient-Based Anatomic Mapping", NeuroImage, 37:S109-S115, available online Jun. 2007.
Machado et al., "Deep Brain Stimulation for Parkinson's Disease: Surgical Technique and Perioperative Management", Movement Disorders, 21 :S247-S258, Jun. 2006.
Maks et al., "Deep Brain Stimulation Activation Volumes and Their Association with Neurophysiological Mapping and Therapeutic Outcomes", Downloaded from jnnp.bmj.com, pp. 1-21, published online Apr. 2008.
Moran et al., "Real-Time Refinment of Subthalamic Nucleous Targeting Using Bayesian Decision-Making on the Root Mean Square Measure", Movement Disorders, 21: 1425-1431, published online Jun. 2006.
Sakamoto et al., "Homogeneous Fluorescence Assays for RNA Diagnosis by Pyrene-Conjugated 2'-0-Methyloligoribonucleotides", Nucleosides, Nucleotides, and Nucleric Acids, 26:1659-1664, on line publication Oct. 2007.
Winkler et al., The First Evaluation of Brain Shift During Functional Neurosurgery by Deformation Field Analysis, J. Neural. Neurosurg. Psychiatry, 76:1161-1163, Aug. 2005.
Yelnik et al., "A Three-Dimensional, Histological and Deformable Atlas of the Human Basal J Ganglia. I. Atlas Construction Based on Immunohistochemical and MRI Data", NeuroImage, 34:618,-638,Jan. 2007.
Ward, H. E., et al., "Update on deep brain stimulation for neuropsychiatric disorders," Neurobiol Dis 38 (3) (2010), pp. 346-353.
Alberts et al. "Bilateral subthalamic stimulation impairs cognitive-motor performance in Parkinson's disease patients." Brain (2008), 131, 3348-3360, Abstract.
Grill, WM., et al., "Electrical properties of implant encapsulation tissue", Ann Biomed Eng. vol. 22. (1994), 23-33.
An, et al., "Prefrontal cortical projections to longitudinal cols. in the midbrain periaqueductal gray in macaque monkeys," J Comp Neural 401 (4) (1998), pp. 455-479.
Haslinger, B., et al., "Frequency-correlated decreases of motor cortex activity associated with subthalamic nucleus stimulation in Parkinson's disease.", Neuroimage 28(3). (Nov. 15, 2005),598-606.
Carmichael, S. T., et al., "Connectional networks within the orbital and medial prefrontal cortex of macaque monkeys," J Comp Neural 371 (2) (1996), pp. 179-207.
Croxson, et al., "Quantitative investigation of connections of the prefrontal cortex in the human and macaque using probabilistic diffusion tractography," J Neurosci 25 (39) (2005), pp. 8854-8866.
Frankemolle, et al., "Reversing cognitive-motor impairments in Parkinson's disease patients using a computational modelling approach to deep brain stimulation programming," Brain 133 (2010), pp. 746-761.
Freedman, et al., "Subcortical projections of area 25 (subgenual cortex) of the macaque monkey," J Comp Neurol 421 (2) (2000), pp. 172-188.
Giacobbe, et al., "Treatment resistant depression as a failure of brain homeostatic mechanisms: implications for deep brain stimulation," Exp Neural 219 (1) (2009), pp. 44-52.
Goodman, et al., "Deep brain stimulation for intractable obsessive compulsive disorder: pilot study using a blinded, staggered-onset design," Biol Psychiatry 67 (6) (2010), pp. 535-542.

(56) References Cited

OTHER PUBLICATIONS

Greenberg, et al., "Deep brain stimulation of the ventral internal capsule/ventral striatum for obsessive-compulsive disorder: worldwide experience," Mol Psychiatry 15 (1) (2010), pp. 64-79.
Greenberg et al., "Three-year outcomes in deep brain stimulation for highly resistant obsessive-compulsive disorder," Neuropsychopharmacology 31 (11) (2006), pp. 2384-2393.
Gutman, et al., "A tractography analysis of two deep brain stimulation white matter targets for depression," Biol Psychiatry 65 (4) (2009), pp. 276-282.
Haber, et al., "Reward-related cortical inputs define a large striatal region in primates that interface with associative cortical connections, providing a substrate for incentive-based learning," J Neurosci 26 (32) (2006), pp. 8368-8376.
Haber, et al., "Cognitive and limbic circuits that are affected by deep brain stimulation," Front Biosci 14 (2009), pp. 1823-1834.
Hines, M. L., et al., "The Neuron simulation environment," Neural Comput., 9(6) (Aug. 15, 1997), pp. 1179-1209.
Hua, et al., "Tract probability maps in stereotaxic spaces: analyses of white matter anatomy and tract-specific quantification," Neuroimage 39 (1) (2008), pp. 336-347.
Johansen-Berg, et al., "Anatomical connectivity of the subgenual cingulate region targeted with deep brain stimulation for treatment-resistant depression," Cereb Cortex 18 (6) (2008), pp. 1374-1383.
Kopell, et al., "Deep brain stimulation for psychiatric disorders," J Clin Neurophysiol 21 (1) (2004), pp. 51-67.
Lozano, et al., "Subcallosal cingulate gyrus deep brain stimulation for treatment-resistant depression," Biol Psychiatry 64 (6) (2008), pp. 461-467.
Lujan, et al., "Tracking the mechanisms of deep brain stimulation for neuropsychiatric disorders," Front Biosci 13 (2008), pp. 5892-5904.
Lujan, J.L. et al., "Automated 3-Dimensional Brain Atlas Fitting to Microelectrode Recordings from Deep Brain Stimulation Surgeries," Stereotact. Func!. Neurosurg. 87(2009), pp. 229-240.
Machado. et al., "Functional topography of the ventral striatum and anterior limb of the internal capsule determined by electrical stimulation of awake patients," Clin Neurophysiol 120 (11) (2009), pp. 1941-1948.
Malone, et al., "Deep brain stimulation of the ventral capsule/ventral striatum for treatment-resistant depression," Biol Psychiatry 65 (4) (2009), pp. 267-275.
Mayberg, H. S., et al., "Deep brain stimulation for treatment-resistant depression," Neuron, 45(5) (Mar. 3, 2005), pp. 651-660.
Mayberg, H. S., et al., "Limbic-cortical dysregulation: a proposed model of depression," J Neuropsychiatry Clin Neurosci. 9 (3) (1997), pp. 471-481.
McIntyre, C. C., et al., "Network perspectives on the mechanisms of deep brain stimulation," Neurobiol Dis 38 (3) (2010), pp. 329-337.
Miocinovic, S., et al., "Experimental and theoretical characterization of the voltage distribution generated by deep brain stimulation," Exp Neurol 216 (i) (2009), pp. 166-176.
Nuttin, et al., "Electrical stimulation in anterior limbs of internal capsules in patients with obsessive-compulsive disorder," Lancet 354 (9189) (1999), p. 1526.
Saxena, et al., "Cerebral glucose metabolism in obsessive-compulsive hoarding," Am J Psychiatry. 161 (6) (2004), pp. 1038-1048.
Viola, et al., "Importance-driven focus of attention," IEEE Trans Vis Comput Graph 12 (5) (2006), pp. 933-940.
Wakana, S., et al., "Reproducibility of quantitative tractography methods applied to cerebral white matter," Neuroimage 36 (3) (2007), pp. 630-644.
Mayr et al., "Basic Design and Construction of the Vienna FES Implants: Existing Solutions and Prospects for New Generations of Implants", Medical Engineering & Physics, 2001; 23:53-60.

* cited by examiner

METHODS AND SYSTEMS FOR MONITORING OR ASSESSING MOVEMENT DISORDERS OR OTHER PHYSIOLOGICAL PARAMETERS USING A STIMULATION SYSTEM

CROSS-REFERENCE TO RELATED APPLICATIONS

This application claims the benefit under 35 U.S.C. § 119 (e) of U.S. Provisional Patent Application Ser. No. 63/287,775, filed Dec. 9, 2021, which is incorporated herein by reference.

FIELD

The present disclosure is directed to the area of implantable electrical stimulation systems and methods of making and using the systems. The present disclosure is also directed to methods and systems for monitoring or assessing movement disorders or other physiological parameters using the implantable electrical stimulation system.

BACKGROUND

Implantable electrical stimulation systems have proven therapeutic in a variety of diseases and disorders. For example, spinal cord stimulation systems have been used as a therapeutic modality for the treatment of chronic pain syndromes. Peripheral nerve stimulation has been used to treat chronic pain syndrome and incontinence, with a number of other applications under investigation. Deep brain stimulation can be used to treat a variety of diseases and disorders.

Stimulators have been developed to provide therapy for a variety of treatments. A stimulator can include a control module (with a pulse generator) and one or more stimulator electrodes. The one or more stimulator electrodes can be disposed along one or more leads, or along the control module, or both. The stimulator electrodes are in contact with or near the nerves, muscles, or other tissue to be stimulated. The pulse generator in the control module generates electrical pulses that are delivered by the electrodes to body tissue.

BRIEF SUMMARY

One aspect is a method for operation of an electrical stimulation system including an implantable control module configured for implantation in a patient and a lead coupled, or coupleable, to the implantable control module and including electrodes disposed along a distal portion of the lead. The method includes directing electrical stimulation through the electrodes of the lead; and monitoring movements of a hand positioned over an implantation site of the implantable control module using an accelerometer coupled to a processor of the implantable control module.

In at least some aspects, the method further includes assessing tremor based on the monitored movements. In at least some aspects, the method further includes assessing bradykinesia based on the monitored directed movements.

In at least some aspects, the method further includes monitoring tapping of a body region over an implantation site of the implantable control module and performing activities based on the tapping. In at least some aspects, the method further includes associating a specific indicator, trigger, or marker with a predetermined number of taps. In at least some aspects, the method further includes associating a specific one of the activities with each indicator, trigger, or marker.

In at least some aspects, the method further includes assessing whether the patient adopts a hunched posture. In at least some aspects, the method further includes assessing whether speech by the patient is slow. In at least some aspects, the method further includes assessing a volume of speech by the patient. In at least some aspects, the method further includes assessing whether the patient has fallen.

In at least some aspects, the method further includes assessing a cardiac signal of the patient. In at least some aspects, the method further includes assessing respiration of the patient. In at least some aspects, the method further includes assessing snoring or sleep apnea of the patient. In at least some aspects, the method further includes assessing swallowing by the patient. In at least some aspects, the method further includes communicating a warning to an external device based on monitoring or measuring performed using the accelerometer.

Another aspect is an electrical stimulation system that includes a lead having electrodes disposed along a distal portion of the lead; and an implantable control module configured for implantation in a patient. The implantable control module includes a processor configured for directing electrical stimulation through the electrodes of the lead, and an accelerometer coupled to the processor. In at least some aspects the implantable control module, processor, and accelerometer are configured to perform any of the methods described above.

A further aspect is an electrical stimulation system including a lead including a plurality of electrodes disposed along a distal portion of the lead; a sensor; and an implantable control module configured for implantation in a patient and coupled, or coupleable, to the lead, wherein the sensor is disposed in, or on, the implantable control module. The implantable control module includes a processor configured for directing electrical stimulation through the electrodes of the lead, detecting, by the sensor, a plurality of taps of a body region of a patient over an implantation site of the implantable control module, identifying, by a processor of the implantable control module, an indicator, trigger, or marker based on the detected tapping, and performing an activity corresponding to the identified indicator, trigger, or marker.

In at least some aspects, identifying the indicator, trigger, or marker includes identifying the indicator, trigger, or marker based on the number of taps detected. In at least some aspects, performing the activity includes storing an indication that the patient has taken medication in response to the detected taps. In at least some aspects, performing the activity includes initiating an assessment in response to the detected taps. In at least some aspects, performing the activity includes at least one of the following: increasing or decreasing a stimulation amplitude, marking an event, starting a recording, starting a therapy, or rating a therapy.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association with the accompanying drawings, wherein.

DETAILED DESCRIPTION

The present disclosure is directed to the area of implantable electrical stimulation systems and methods of making and using the systems. The present disclosure is also directed to methods and systems for monitoring or assessing movement disorders or other physiological parameters using the implantable electrical stimulation system.

Suitable implantable electrical stimulation systems include, but are not limited to, a least one lead with one or more electrodes disposed on a distal portion of the lead and one or more terminals disposed on one or more proximal portions of the lead. Leads include, for example, percutaneous leads, paddle leads, cuff leads, or any other arrangement of electrodes on a lead. Examples of electrical stimulation systems with leads are found in, for example, U.S. Pat. Nos. 6,181,969; 6,516,227; 6,609,029; 6,609,032; 6,741,892; 7,244,150; 7,450,997; 7,672,734; 7,761,165; 7,783,359; 7,792,590; 7,809,446; 7,949,395; 7,974,706; 8,175,710; 8,224,450; 8,271,094; 8,295,944; 8,364,278; 8,391,985; and 8,688,235; and U.S. Patent Applications Publication Nos. 2007/0150036; 2009/0187222; 2009/0276021; 2010/0076535; 2010/0268298; 2011/0005069; 2011/0004267; 2011/0078900; 2011/0130817; 2011/0130818; 2011/0238129; 2011/0313500; 2012/0016378; 2012/0046710; 2012/0071949; 2012/0165911; 2012/0197375; 2012/0203316; 2012/0203320; 2012/0203321; 2012/0316615; 2013/0105071; and 2013/0197602, all of which are incorporated herein by reference. In the discussion below, a percutaneous lead will be exemplified, but it will be understood that the methods and systems described herein are also applicable to paddle leads and other leads.

A percutaneous lead for electrical stimulation (for example, deep brain, spinal cord, or peripheral nerve stimulation) includes stimulation electrodes that can be ring electrodes, segmented electrodes that extend only partially around the circumference of the lead, or any other type of electrode, or any combination thereof. The segmented electrodes can be provided in sets of electrodes, with each set having electrodes circumferentially distributed about the lead at a particular longitudinal position. A set of segmented electrodes can include any suitable number of electrodes including, for example, two, three, four, or more electrodes. For illustrative purposes, the systems and leads are described herein relative to use for deep brain stimulation, but it will be understood that any of the leads can be used for applications other than deep brain stimulation, including spinal cord stimulation, peripheral nerve stimulation, dorsal root ganglion stimulation, sacral nerve stimulation, or stimulation of other nerves, muscles, and tissues.

Figure 1:
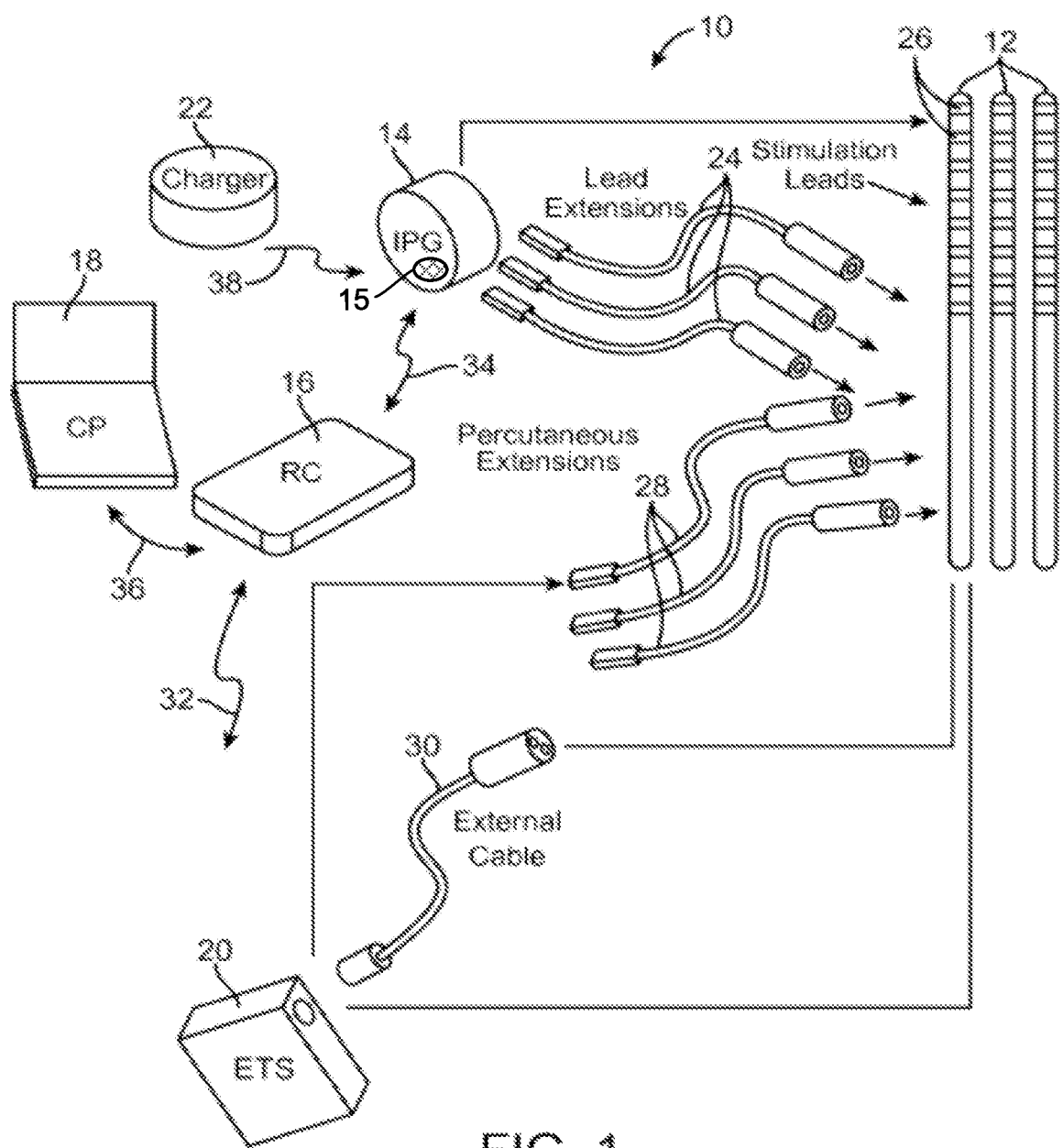
FIG. 1 is a schematic view of one embodiment of an electrical stimulation system.

Turning to FIG. 1, one embodiment of an electrical stimulation system 10 includes one or more stimulation leads 12 and an implantable pulse generator (IPG) 14. The system 10 can also include one or more of an external remote control (RC) 16, a clinician's programmer (CP) 18, an external trial stimulator (ETS) 20, or an external charger 22. The IPG and ETS are examples of control modules for the electrical stimulation system.

The IPG 14 is physically connected, optionally via one or more lead extensions 24, to the stimulation lead(s) 12. Each lead carries multiple electrodes 26 arranged in an array. The IPG 14 includes pulse generation circuitry that delivers electrical stimulation energy in the form of, for example, a pulsed electrical waveform (i.e., a temporal series of electrical pulses) to the electrode array 26 in accordance with a set of stimulation parameters. The implantable pulse generator can be implanted into a patient's body, for example, below the patient's clavicle area or within the patient's buttocks or abdominal cavity or at any other suitable site. The implantable pulse generator can have multiple stimulation channels which may be independently programmable to control the magnitude of the current stimulus from each channel. In some embodiments, the implantable pulse generator can have any suitable number of stimulation channels including, but not limited to, 4, 6, 8, 12, 16, 32, or more stimulation channels. The implantable pulse generator can have one, two, three, four, or more connector ports, for receiving the terminals of the leads and/or lead extensions.

The ETS 20 may also be physically connected, optionally via the percutaneous lead extensions 28 and external cable 30, to the stimulation leads 12. The ETS 20, which may have similar pulse generation circuitry as the IPG 14, also delivers electrical stimulation energy in the form of, for example, a pulsed electrical waveform to the electrode array 26 in accordance with a set of stimulation parameters. One difference between the ETS 20 and the IPG 14 is that the ETS 20 is often a non-implantable device that is used on a trial basis after the neurostimulation leads 12 have been implanted and prior to implantation of the IPG 14, to test the responsiveness of the stimulation that is to be provided. Any functions described herein with respect to the IPG 14 can likewise be performed with respect to the ETS 20.

The RC 16 may be used to telemetrically communicate with or control the IPG 14 or ETS 20 via a uni- or bi-directional wireless communications link 32. Once the IPG 14 and neurostimulation leads 12 are implanted, the RC 16 may be used to telemetrically communicate with or control the IPG 14 via a uni- or bi-directional communications link 34. Such communication or control allows the IPG 14 to be turned on or off and to be programmed with different stimulation parameter sets. The IPG 14 may also be operated to modify the programmed stimulation parameters to actively control the characteristics of the electrical stimulation energy output by the IPG 14. The CP 18 allows a user, such as a clinician, the ability to program stimulation parameters for the IPG 14 and ETS 20 in the operating room and in follow-up sessions. Alternately, or additionally, stimulation parameters can be programed via wireless communications (e.g., Bluetooth) between the RC 16 (or external device such as a hand-held electronic device) and the IPG 14. In at least some embodiments, the RC 16 can be a mobile phone, tablet, desktop computer, or the like.

The CP 18 may perform this function by indirectly communicating with the IPG 14 or ETS 20, through the RC 16, via a wireless communications link 36. Alternatively, the CP 18 may directly communicate with the IPG 14 or ETS 20 via a wireless communications link (not shown). The stimulation parameters provided by the CP 18 are also used to program the RC 16, so that the stimulation parameters can be subsequently modified by operation of the RC 16 in a stand-alone mode (i.e., without the assistance of the CP 18).

For purposes of brevity, the details of the RC 16, CP 18, ETS 20, and external charger 22 will not be further described herein. Details of exemplary embodiments of these devices are disclosed in U.S. Pat. No. 6,895,280, which is expressly incorporated herein by reference. Other examples of electrical stimulation systems can be found at U.S. Pat. Nos. 6,181,969; 6,516,227; 6,609,029; 6,609,032; 6,741,892; 7,949,395; 7,244,150; 7,672,734; and 7,761,165; 7,974,706; 8,175,710; 8,224,450; and 8,364,278; and U.S. Patent Application Publication No. 2007/0150036, as well as the other references cited above, all of which are incorporated herein by reference.

Figure 2:
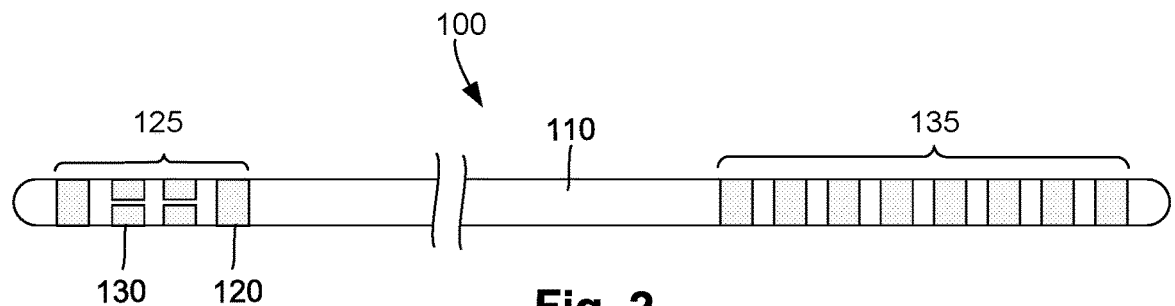
FIG. 2 is a schematic side view of one embodiment of an electrical stimulation lead.

FIG. 2 illustrates one embodiment of a lead 100 with electrodes 125 disposed at least partially about a circumference of the lead 100 along a distal end portion of the lead 100 and terminals 135 disposed along a proximal end portion of the lead 100. The lead 100 can be implanted near or within the desired portion of the body to be stimulated such as, for example, the brain, spinal cord, or other body organs or tissues. In one example of operation for deep brain stimulation, access to the desired position in the brain can be accomplished by drilling a hole in the patient's skull or cranium with a cranial drill (commonly referred to as a burr), and coagulating and incising the dura mater, or brain covering. The lead 100 can be inserted into the cranium and brain tissue with the assistance of a stylet (not shown). The lead 100 can be guided to the target location within the brain using, for example, a stereotactic frame and a microdrive motor system. In at least some embodiments, the microdrive motor system can be fully or partially automatic. The microdrive motor system may be configured to perform at least one of the following actions (alone or in combination): insert the lead 100, advance the lead 100, retract the lead 100, or rotate the lead 100.

In at least some embodiments, measurement devices coupled to the muscles or other tissues affected by the target neurons or neural structures, or a unit responsive to the patient or clinician, can be coupled to the IPG 14 or microdrive motor system. The measurement device, user, or clinician can indicate a response by the target muscles or other tissues to the stimulation or recording electrode(s) to further identify the target neurons and facilitate positioning of the stimulation electrode(s). For example, if the target neurons are directed to a muscle experiencing tremors, a measurement device can be used to observe the muscle and indicate changes in, for example, tremor frequency or amplitude in response to stimulation of neurons. Alternatively, the patient or clinician can observe the muscle and provide feedback.

The lead 100 for deep brain stimulation can include stimulation electrodes, recording electrodes, or both. In at least some embodiments, the lead 100 is rotatable so that the stimulation electrodes can be aligned with the target neurons after the neurons have been located using the recording electrodes.

Stimulation electrodes may be disposed on the circumference of the lead 100 to stimulate the target neurons. Stimulation electrodes may be ring shaped so that current projects from each electrode radially from the position of the electrode along a length of the lead 100. In the embodiment of FIG. 2, two of the electrodes 125 are ring electrodes 120. Ring electrodes typically do not enable stimulus current to be directed from only a limited angular range around a lead. Segmented electrodes 130, however, can be used to direct stimulus current to a selected angular range around a lead.

When segmented electrodes are used in conjunction with an implantable pulse generator that delivers constant current stimulus, current steering can be achieved to more precisely deliver the stimulus to a position around an axis of a lead (i.e., radial positioning around the axis of a lead). To achieve current steering, segmented electrodes can be utilized in addition to, or as an alternative to, ring electrodes.

The lead 100 includes a lead body 110, terminals 135, at least one ring electrode 120, and at least one set of segmented electrodes 130 (or any other combination of electrodes). The lead body 110 can be formed of a biocompatible, non-conducting material such as, for example, a polymeric material. Suitable polymeric materials include, but are not limited to, silicone, polyurethane, polyurea, polyurethane-urea, polyethylene, or the like. Once implanted in the body, the lead 100 may be in contact with body tissue for extended periods of time. In at least some embodiments, the lead 100 has a cross-sectional diameter of no more than 1.5 mm and may be in the range of 0.5 to 1.5 mm. In at least some embodiments, the lead 100 has a length of at least 10 cm and the length of the lead 100 may be in the range of 10 to 70 cm.

The electrodes 125 can be made using a metal, alloy, conductive oxide, or any other suitable conductive biocompatible material. Examples of suitable materials include, but are not limited to, platinum, platinum iridium alloy, iridium, titanium, tungsten, palladium, palladium rhodium, or the like. Preferably, the electrodes 125 are made of a material that is biocompatible and does not substantially corrode under expected operating conditions in the operating environment for the expected duration of use.

Each of the electrodes 125 can either be used or unused (OFF). When an electrode is used, the electrode can be used as an anode or cathode and carry anodic or cathodic current. In some instances, an electrode might be an anode for a period of time and a cathode for a period of time.

Deep brain stimulation leads may include at least one set of segmented electrodes. Segmented electrodes may provide for superior current steering than ring electrodes because target structures in deep brain stimulation are not typically symmetric about the axis of the distal electrode array. Instead, a target may be located on one side of a plane running through the axis of the lead. Through the use of a radially segmented electrode array ("RSEA"), current steering can be performed not only along a length of the lead but also around a circumference of the lead. This provides precise three-dimensional targeting and delivery of the current stimulus to neural target tissue, while potentially avoiding stimulation of other tissue. Examples of leads with segmented electrodes include U.S. Pat. Nos. 8,473,061; 8,571,665; 8,792,993; 9,248,272; 9,775,988; and 10,286, 205; U.S. Patent Application Publications Nos. 2010/0268298; 2011/0005069; 2011/0130803; 2011/0130816; 2011/0130817; 2011/0130818; 2011/0078900; 2011/0238129; 2012/0016378; 2012/0046710; 2012/0071949; 2012/0165911; 2012/197375; 2012/0203316; 2012/0203320; 2012/0203321; 2013/0197424; 2013/0197602; 2014/0039587; 2014/0353001; 2014/0358208; 2014/0358209; 2014/0358210; 2015/0045864; 2015/0066120; 2015/0018915; and 2015/0051681, all of which are incorporated herein by reference.

Figure 3:
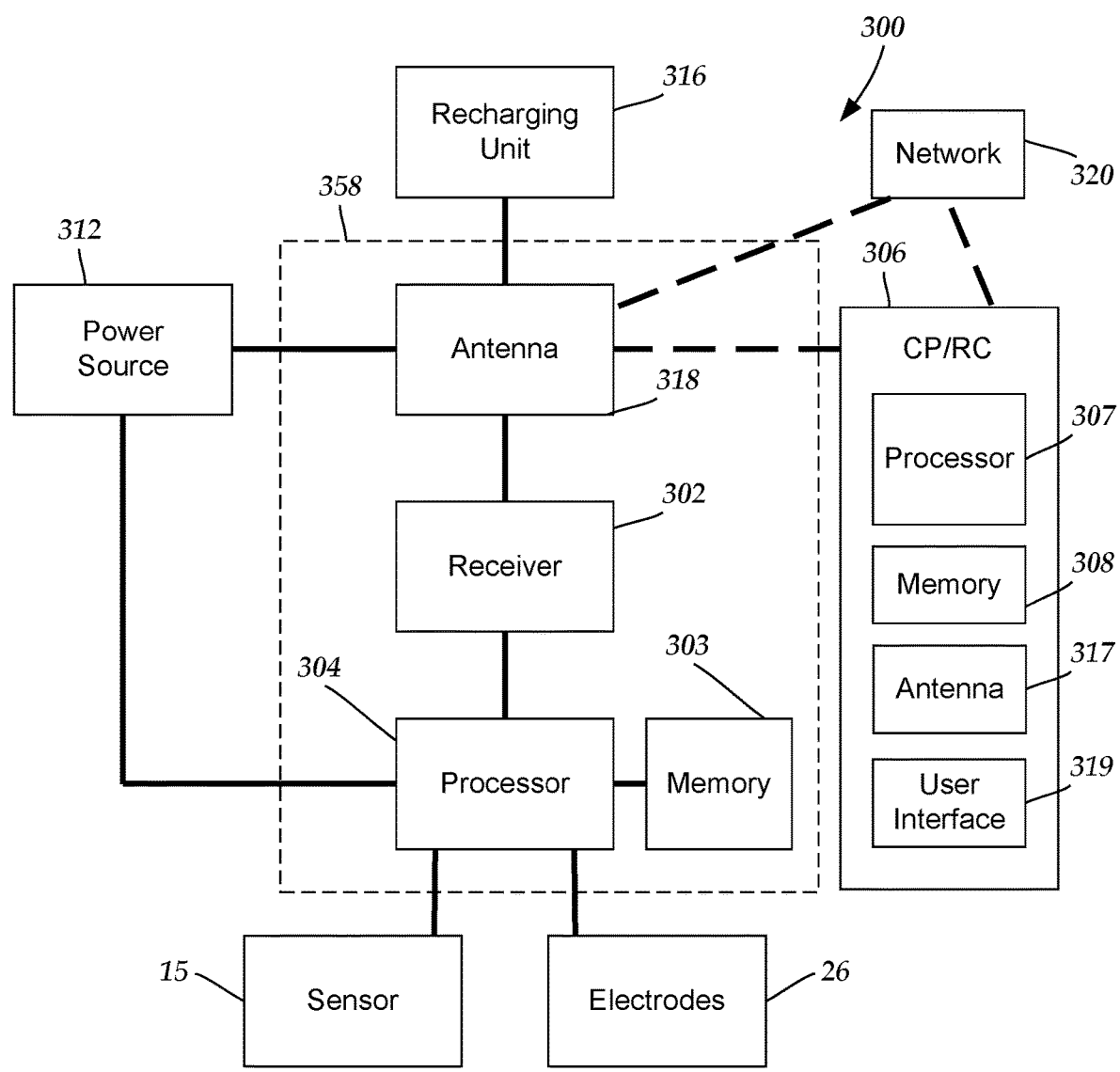
FIG. 3 is a schematic block diagram of a system for practicing the methods described herein.

FIG. 3 is a schematic overview of one embodiment of components of an electrical stimulation system 300 including an electronic subassembly 310 disposed within an IPG 14 (FIG. 1). It will be understood that the electrical stimulation system can include more, fewer, or different components and can have a variety of different configurations including those configurations disclosed in the stimulator references cited herein.

The IPG 14 (FIG. 1) can include, for example, a power source 312, antenna 318, receiver 302, processor 304, and memory 305, as well as a sensor 15 that can be disposed in, or on, the IPG. Some of the components (for example, power source 312, antenna 318, receiver 302, processor 304, and memory 305) of the electrical stimulation system can be positioned on one or more circuit boards or similar carriers within a sealed housing of the IPG 14 (FIG. 1), if desired. Unless indicated otherwise, the term "processor" refers to both embodiments with a single processor and embodiments with multiple processors.

An external device, such as a CP or RC 306, can include a processor 307, memory 308, an antenna 317, and a user interface 319. The user interface 319 can include, but is not limited to, a display screen on which a digital user interface can be displayed and any suitable user input device, such as a keyboard, touchscreen, mouse, track ball, or the like or any combination thereof.

Any power source 312 can be used including, for example, a battery such as a primary battery or a rechargeable battery. Examples of other power sources include super capacitors, nuclear or atomic batteries, mechanical resonators, infrared collectors, thermally-powered energy sources, flexural powered energy sources, bioenergy power sources, fuel cells, bioelectric cells, osmotic pressure pumps, and the like including the power sources described in U.S. Pat. No. 7,437,193, incorporated herein by reference in its entirety.

As another alternative, power can be supplied by an external power source through inductive coupling via the antenna 318 or a secondary antenna. The external power source can be in a device that is mounted on the skin of the user or in a unit that is provided near the user on a permanent or periodic basis.

If the power source 312 is a rechargeable battery, the battery may be recharged using the antenna 318, if desired. Power can be provided to the battery for recharging by inductively coupling the battery through the antenna to a recharging unit 316 external to the user. Examples of such arrangements can be found in the references identified above.

In one embodiment, electrical current is emitted by the electrodes 26 on the lead body to stimulate nerve fibers, muscle fibers, or other body tissues near the electrical stimulation system. A processor 304 is generally included to control the timing and electrical characteristics of the electrical stimulation system. For example, the processor 304 can, if desired, control one or more of the timing, frequency, amplitude, width, and waveform of the pulses. In addition, the processor 304 can select which electrodes can be used to provide stimulation, if desired. In some embodiments, the processor 304 may select which electrode(s) are cathodes and which electrode(s) are anodes. In some embodiments, the processor 304 may be used to identify which electrodes provide the most useful stimulation of the desired tissue. Instructions for the processor 304 can be stored on the memory 305. Instructions for the processor 307 can be stored on the memory 308.

Any processor 304 can be used for the IPG and can be as simple as an electronic device that, for example, produces pulses at a regular interval or the processor can be capable of receiving and interpreting instructions from the CP/RC 306 (such as CP 18 or RC 16 of FIG. 1) that, for example, allows modification of pulse characteristics. In the illustrated embodiment, the processor 304 is coupled to a receiver 302 which, in turn, is coupled to the antenna 318. This allows the processor 304 to receive instructions from an external source to, for example, direct the pulse characteristics and the selection of electrodes, if desired. Any suitable processor 307 can be used for the CP/RC 306.

Among other functions, in at least some embodiments, the processor 304 receives signals or measurements from the sensor 15 and processes the signals/measurements. In at least some embodiments, the processor 304 can take action based on the processed signals/measurements, as described in more detail below. In at least some embodiments, the IPG 14 can transmit the signals/measurements from the sensor 15 (or the processed signals/measurements) to the CP/RC 306 or to another device coupled to the network 320. As described below, in at least some embodiments, the IPG 14 can transmit a warning or other information that is based on the signals/measurements from the sensor 15 to the CP/RC 306 or to another device coupled to the network 320.

Any suitable memory 305, 308 can be used including computer-readable storage media may include, but is not limited to, volatile, nonvolatile, non-transitory, removable, and non-removable media implemented in any method or technology for storage of information, such as computer readable instructions, data structures, program modules, or other data. Examples of computer-readable storage media include, but are not limited to, RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a processor.

In one embodiment, the antenna 318 is capable of receiving signals (e.g., RF signals) from an antenna 317 of a CP/RC 306 (see, CP 18 or RC 16 of FIG. 1) which is programmed or otherwise operated by a user. The signals sent to the processor 304 via the antenna 318 and receiver 302 can be used to modify or otherwise direct the operation of the electrical stimulation system. For example, the signals may be used to modify the pulses of the electrical stimulation system such as modifying one or more of pulse width, pulse frequency, pulse waveform, and pulse amplitude. The signals may also direct the electrical stimulation system 300 to cease operation, to start operation, to start signal acquisition, to stop signal acquisition, to start charging the battery, or to stop charging the battery. In other embodiments, the stimulation system does not include an antenna 318 or receiver 302 and the processor 304 operates as programmed.

Optionally, the electrical stimulation system 300 may include a transmitter (not shown) coupled to the processor 304 and the antenna 318 for transmitting signals back to the CP/RC 306 or another unit capable of receiving the signals. For example, the electrical stimulation system 300 may transmit signals indicating whether the electrical stimulation system 300 is operating properly or not or indicating when the battery needs to be charged or the level of charge remaining in the battery. The processor 304 may also be capable of transmitting information about the pulse characteristics so that a user or clinician can determine or verify the characteristics.

Transmission of signals can occur using any suitable method, technique, or platform including, but not limited to, inductive transmission, radiofrequency transmission, Bluetooth™, Wi-Fi, cellular transmission, near field transmission, infrared transmission, or the like or any combination thereof. In addition, the IPG 14 can be wirelessly coupled to the RC 16 or CP 18 using any suitable arrangement include direct transmission or transmission through a network, such as a local area network, wide area network, the Internet, or the like or any combination thereof. The CP 18 or RC 16 may also be capable of coupling to, and sending data or other information to, a network 320, such as a local area network, wide area network, the Internet, or the like or any combination thereof.

The methods and systems described herein may be embodied in many different forms and should not be construed as limited to the embodiments set forth herein. Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (for example, RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

Movement disorders may produce a variety of symptoms or effects (including motor symptoms or effects). In at least some instances, movement disorders can be treated by electrical stimulation such as, for example, deep brain stimulation (DBS). In at least some embodiments, a physician, clinician, stimulation programmer, or other individual can evaluate the symptoms or effects (for example, tremor, bradykinesia, or rigidity or any combination thereof) by observing a patient's behavior while resting or conducting clinical tasks. In at least some embodiments, this evaluation can occur during an electrical stimulation programming session. Although the scoring of such symptoms or effects by a single individual may be consistent within itself, each individual will likely score a patient's symptoms or effects somewhat differently. This can lead to inter-rater variability. Although wearable devices with sensors for measuring the symptoms or effects may produce a comparable clinical score (possibly with greater consistency) patients may feel uncomfortable with technology and may not wish to have another medical device.

In at least some embodiments, an electrical stimulation system can include an implantable control module, such as IPG 14, that includes at least one sensor 15, such as an accelerometer, to measure symptoms or effects, as illustrated in FIG. 1. IPG 14 is used herein as an example implantable control module. It will be understood that any other suitable implantable control module can be used in place of IPG 14 in any of the embodiments and examples presented herein.

In at least some embodiments, the electrical stimulation system may not use or need a wearable or secondary device to measure the symptoms or effects but, instead, the sensor(s) 15 is/are disposed in, or on, an implantable control module, such as IPG 14 of FIG. 1. The IPG 14 will be used herein as an example of an implantable control module, but it will be understood that any other suitable implantable control module can be used.

In at least some embodiments, the sensor 15 is an accelerometer. Other sensors 15 can be used instead or, or in addition to, an accelerometer including, but not limited to, a gyroscope, a magnetometer, or the like or any combination thereof. In at least some embodiments, the sensor 15 is an inertial measurement unit which typically contains an accelerometer, gyroscope, magnetometer, or any combination thereof.

The implantable control module, such as IPG 14, is often implanted in the patient's chest, torso, or trunk area where there is substantial space for the device even though the lead(s) 12 may be implanted in the brain or elsewhere in the body. In at least some embodiments, lead extension(s) 24 couple the lead(s) 12 to the IPG 14.

In at least some embodiments, the patient may be directed by the IPG 14, RC 16, CP 18, ETS 20, or other device to perform an interactive measurement using the sensor(s) 15 in the IPG 14. For at least some interactive measurements, the patient may be requested to place a hand on the body over the site where the IPG 14 is implanted.

As an example, to measure tremor the patient may be asked to rest a hand directly over the implanted IPG. In at least some embodiments, the patient may be asked to curl the fingers of the hand toward the chest to amplify the tremor motion. The sensor 15 in the IPG 14 can sense the tremor of the patient's hand.

As another example, to measure bradykinesia the patient may be asked to rest their hand directly over the implanted IPG. The patient may be asked to tap their index finger repeatedly on the body over the IPG. In at least some embodiments, the finger tapping speed can be used as a measurement for bradykinesia which is indicated by a slowness of motion.

Figure 4:
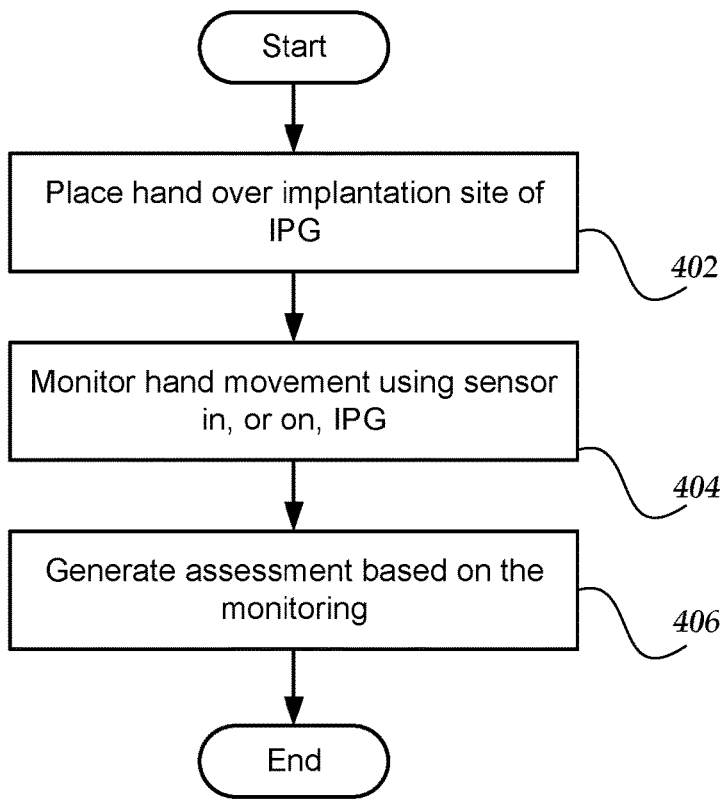
FIG. 4 is a flowchart of one embodiment of a method for performing an assessment.

FIG. 4 is a flowchart of one embodiment of a method of performing an assessment, such as the tremor or bradykinesia assessments described above. In step 402, the patient is directed to place a hand over the implantation site of the IPG 14. In step 404, the sensor 15, which is disposed in, or on, the IPG 14, monitors hand movement. In at least some embodiments, the patient is directed to perform a specific hand movement. In other embodiments, the patient is merely directed to hold the hand in place. In step 406, an assessment is generated based on the monitoring of the hand movement monitored by the sensor 15. Examples of the assessment for tremor and bradykinesia are described above. It will be understood that any other suitable assessment can be performed for any suitable disease or disorder.

Accelerometers detect the magnitude and direction of acceleration. Movement may be absent or vary in amplitude during a tremor or other assessment because the weight or position of the hand over the device changes. In at least some embodiments, the assessment can be enhanced by removing or reducing extraneous signals, such as a cardiac signals or respiration. In at least some embodiments, a low pass filter can be used to remove or reduce cardiac signals or impacts from hand contact to the torso of the patient. In at least some embodiments, a high pass filter can be used to remove or reduce respiration effects. In at least some embodiments, the cutoff frequencies for the high pass filter or the low pass filter (or both) can be selected or adjusted based on the type of assessment as different activities can have different expected frequency ranges. Alternatively or additionally, in at least some embodiments, the accelerometer signal can be decomposed into different signals which may be assigned to different sources or activities such as, for example, cardiac signals, respiration, tapping, hand movement during an assessment, or the like or any combination thereof.

A sensor 15, such as an accelerometer, disposed in, or on, the implantable control module, such as IPG 14, can also be used for communication from the patient. In at least some embodiments, the sensor 15 can receive a tapping input which can be interpreted by the implantable control module as a marker, indicator, or trigger. As an example, a patient can use multiple taps on the region of the body over the implantable control module to provide basic instructions or indications to the implantable control module through the sensor 15. In at least some embodiments, multiple taps are required to distinguish from inadvertent contact with the site.

As an example, a patient could tap the region of the body (for example, the torso) over the IPG 14 (with sensor 15) twice (or any other suitable number of times) to indicate that the patient has taken medication. In at least some embodiments, this indication from the patient can be stored in the IPG 14 (preferably with a timestamp) and used as part of a monitoring regimen that may be useful for monitoring medication compliance, symptom response to medication, or physiological changes arising from the medication. In at least some embodiments, the tapping indication (that the patient has taken medication) can trigger a change by the IPG 14 in features (for example, stimulation parameters) of stimulation. As an example, the IPG 14 may reduce the stimulation amplitude when the presence of medication in the patient's body is highest and then gradually increase the stimulation amplitude over time as the medication concentration decreases.

As another example, a patient can tap the region of the body over the IPG 14 (with sensor 15) three times (or any other suitable number of times) to indicate that the patient would like to initiate a measurement or assessment of tremor or bradykinesia or perform some other measurement or assessment. The measurement(s) or assessment(s) can be stored on the IPG 14, CP 18, RC 16, or elsewhere and may be used to adjust stimulation. In at least some embodiments, a timestamp is stored with the measurement(s) or assessment(s). In at least some embodiments, the stored measurement(s) or assessment(s) can be stored temporarily or permanently on the IPG 14 (or other control module.) In at least some embodiments, the stored measurement(s) or assessment(s) can be transferred to an external device, such as CP 18, RC 16, or elsewhere, for storage or processing.

Other examples of indications, triggers, or markers that can be accessed by tapping include, but are not limited to, increasing or decreasing stimulation amplitude, marking an event, starting a recording or therapy, rating a therapy, storing information from a sensor for a next amount of time or a previous amount of time (for example, 1, 2, or 5 minutes), or the like or any combination thereof. In at least some embodiments, the indication, trigger, or marker associated with a particular number of taps may be customizable by the patient, clinician, programmer, or other individual using, for example, the CP 18 or RC 16.

Figure 5:
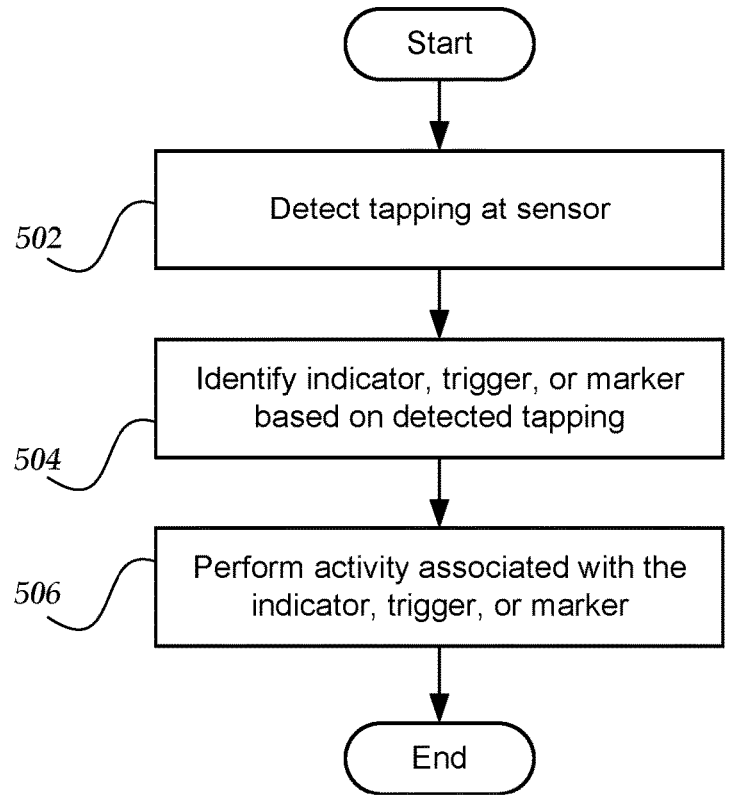
FIG. 5 is a flowchart of one embodiment of a method for utilizing tapping to direct an implantable control module.

FIG. 5 is a flowchart of one embodiment of a method for utilizing tapping to direct the IPG 14. In step 502, the sensor 15 in, or on, the IPG 14 detects tapping on the body of the patient over the implantation site of the IPG. In at least some embodiments, the IPG 14 determines the number of taps and is configured to wait a predetermined period of time after each tap to determine if there is another tap. In step 504, the IPG 14 identifies the indicator, trigger, or marker associated with the tapping. In at least some embodiments, the number of taps determines the identity of the indicator, trigger, or marker. In step 506, the IPG 14 performs an activity that is associated with the indicator, trigger, or marker. Examples of such activities are described above.

A sensor 15 disposed in, or on, an IPG 14 could be used to make a number of additional measurements or assessments. In at least some embodiments, an axis system can be defined in which the y-axis of the sensor 15 is in-line with the patient's head, the x-axis is in-line with the patient's extended arms, and the z-axis is extends out of the patient's chest and back. (Any other suitable axis system can be used.)

With good posture, when the patient is standing, gravity exerts a force downward along the y-axis. Many movement disorders result in a hunched posture which would change the position of the x, y, and z axes of the sensor 15 relative to gravity. Some disorders, such as, for example, stroke and dystonia, can change the symmetry of the shoulders relative to one another leading to a tilt in the patient's body that would manifest as a change in the x and y axes of the sensor 15. Dyskinesia may be indicated by abrupt shifts of the y and z axis of the sensor 15. Such shifts could include rapid acceleration along each axis in a rhythmic forward and back motion indicating an uncontrolled movement of the patient. Hunched posture, a change in the symmetry of the shoulders, or dyskinesia can be detected by the IPG 14 (or other device) using measurements or signals from the sensor 15 indicating the position, changing, or shifting of the axes of the sensor 15 as described above. Such assessments may be stored on the IPG 14 or communicated to the CP 18, RC 16, or other device.

Movement disorders and stimulation treatment can impact a patient's speech patterns potentially effecting the volume, intelligibility, slowness and tremor present in speech. In at least some embodiments, a sensor 15 can be used to assess speech, for example, as the patient repeats of a vocal syllable. The timing between repeated syllables can indicate slowness. In at least some embodiments, a consistently repeated phrase can be used as a voice signature template for each patient. Measurements by the sensor 15 can be analyzed to identify key features of the phrase, such as expected consonants, which result in, for example, a louder harsher sound that can be recorded by the sensor. In at least some embodiments, underlying frequency changes can indicate tremor presence. In at least some embodiments, the timing of these consonants can indicate slowness of speech. In at least some embodiments, the amplitude of the consonants can indicate volume. In at least some embodiments, intelligibility of the speech can be determined by some or all of the following: how closely the pattern measured by the sensor 15 matches the patient's previously measured speech or another template; the difference between the amplitude of hard consonants and smoother voice features; or the amplitude of smoother voice features. In at least some embodiments, the patient may be asked to hold their hand firmly across their throat and chest such that their hand is in contact with their throat and disposed over the IPG 14. This arrangement may amplify the signal at the sensor 15.

In at least some embodiments, increased activity can be a goal of treatment and can be an indicator of quality of life. In at least some embodiments, stimulation therapy during active ambulation may differ from stimulation therapy when sedentary. Changes in the acceleration along the z-axis and, optionally, rhythmic shifts in x- and y-axes can indicate walking or running. Periods of walking interrupted by a period lacking forward motion may identify a motion freezing episode.

In at least some embodiments, measurements by the sensor 15 can be used to determine that amount of time per day that the patient walks, walking speed (average acceleration in the z-axis), the number of freezing episodes while walking, and the average duration of freezing episodes. In at least some embodiments, the detection of walking using measurements by the sensor 15 can trigger a change in the stimulation program from a bradykinesia/tremor treatment program to a freezing gait treatment program.

Falls, which result from gait disturbances or other health related events, can be a serious concern for individuals with movement disorders. In at least some embodiments, a fall can be identified using the sensor 15 by a rapid acceleration along the z-axis followed by a sudden impact event that may be recorded along one or more (or all) of the axes. In at least some embodiments, a fall event followed by little or no change along any of the axes, as indicated by the sensor 15, could indicate a serious situation. In at least some embodiments, the IPG 14 can be arranged to trigger an alert. In at least some embodiments, the alert can could be pushed to a connected device, such as RC 16, CP 18, or another device, to indicate that the patient may need help.

In at least some embodiments, a sensor 15 in, or on, an IPG 14 located near the heart can detect the underlying heartbeat or cardiac signal of the patient. In at least some embodiments, the heartbeat or cardiac signal may be filtered out of the sensor measurements. It will be understood, however, that the heartbeat or cardiac signal may provide health information about the patient. For example, measuring changes in frequency patterns of the heartbeat or cardiac signal using the sensor 21 can indicate arrhythmia or other heart ailments. Increase in the frequency of the heartbeat or cardiac signal (e.g., a rapid heart rate) can indicate stress or other medical conditions. A significant sustained change in heart rate followed by change in the pattern of cardiac signal, or a complete loss of a heartbeat or cardiac signal, can indicate a serious medical condition, such as myocardial infarction. In at least some embodiments, the IPG 14 can be arranged to trigger an alert. In at least some embodiments, the alert can could be pushed to a connected device, such as RC 16, CP 18, or another device, to indicate that the patient may need help.

Respiration results in a consistent rhythmic change in the position of the chest with inspiration and expiration and can provide health information about the patient. In at least some embodiments, measurements by the sensor 15 can be made of one or more of the following using the sensor 15: the respiration rate (e.g., the timing between inspiratory and expiratory peaks); the respiratory volume (e.g., the amplitude between inspiratory and expiratory peaks); coughing occurrence (e.g., high amplitude events affecting one or more of the axes and which may occur regularly in succession and correlate with respiration); cough volume (e.g., the amplitude of the cough signal); or the cough flow rate (e.g., change in the average amplitude over time for a cough) or the like or any combination thereof. In addition, measuring a loss of respiration by the user 15 could indicate a serious medical condition. In at least some embodiments, the IPG 14 can be arranged to trigger an alert. In at least some embodiments, the alert can could be pushed to a connected device, such as RC 16, CP 18, or another device, to indicate that the patient may need help.

In at least some embodiments, measurements by the sensor 15 can be made of the amount of sleep or quality of sleep. In at least some embodiments, detection of sustained relative immobile position, as indicated by a consistent position as detected using the sensor 15, over a given time (for example, at least 30, 45, 60, or 90 minutes) can be indicative of sleep. In at least some embodiments, the length of sleep may be determined. Moreover, identifying periods of sleep using the sensor 15 can be used to alter the therapy as treatment during a patient's sleep may not be equivalent to the patient's treatment during weaking periods. For example, the IPG 14 can switch from a waking treatment program to a sleeping treatment program when sleep is detected using the sensor 15.

Events such as snoring and apnea can indicate potentially serious medical conditions. In at least some embodiments, an underlying rhythmic higher frequency activity correlating with respiration can be indicative of snoring. In at least some embodiments, using the sensor 15 the length of time that snoring can be measured or the volume of snoring can be measured.

In at least some embodiments, cessation of respiration occurring during sleep can be indicative of sleep apnea. In at least some embodiments, the length of time that sleep apnea is detected can be measured using the sensor 15.

In at least some embodiments, the quality of sleep can be measured or estimated using the sensor 15. For example, a combined assessment of two or more of the following factors can be used to measure or estimate the quality of sleep: duration of sleep (for example, the time of onset to end of sleep as determined by mobility), amount of repositioning during sleeping, amount or presence of snoring during sleep, amount or presence of sleep apnea during sleep, or the like or any combination thereof. In at least some embodiments, sleep data can be combined with time of day to determine when sleep is generally occurring (e.g., daytime or evening) and indicate potential health issues if, for example, there is an increase in daytime sleep accompanied by a decrease in nighttime sleep or decrease in the quality of nighttime sleep.

A serious event occurring in many individuals with neural degenerative disorders (including movement related disorders) is the deterioration or loss of the swallowing reflex. Loss of the swallowing reflex can require a feeding tube which is often considered a form of life support. Early detection of swallowing issues can prompt patient referral to rehabilitation which can help strengthen their swallowing reflex.

In at last some embodiments, swallowing can be monitored or measured using a sensor 15 (such as an accelerometer) in, or on, the implantable control module (e.g., IPG 14). In at least some embodiments, the patient is given a request to swallow a given amount of a particular item and the latency between the requested swallowing and the swallowing signal can be measured using the sensor 15, for example, as an acute rhythmic deflection in an accelerometer (to indicate the act of swallowing.) In at least some embodiments, the amplitude of the swallowing signal for the sensor 15 can indicate the strength of the response. In at least some embodiments, the patient is asked to hold their hand firmly across their throat and chest such that their hand is in contact with their throat and overlaying the IPG 14 to amplify the signal.

For movement disorders, as well as other disorders or diseases, overall levels of movement can provide a useful measure of disorder/disease activity. For example, the level of movement may be correlated (negatively or positively) with symptom levels of movement disorders, pain, depression, stroke, or the like. In at least some embodiments, movement can be monitored, measured, or estimated using the sensor 15 by removing offsets (from gravity) from the sensor signal and determining a root mean square (RMS) signal level over a selected period of time (for example, 5, 10, 15, 30, 45, 60, 90, 120, or more minutes.) In at least some embodiments, blocks of time in which large, sustained accelerations occur may be ignored, as these blocks may be due travel in a vehicle (for example, as a passenger in a vehicle speeding up/slowing down or in an aircraft accelerating/decelerating on the runway.

In at least some embodiments, the electrical stimulation system can produce an alert on a connected device (for example, the RC 16, CP 18, or another device such as a doctor's or healthcare provider's computer or a health monitoring service that is connected, for example, through the network 320 (FIG. 3)) upon detection of an event using the accelerometer. In at least some embodiments, the production of an alert may require the patient to have given prior consent, such as selecting alerts in the settings of the electrical stimulation system.

In at least some embodiments, the connected device requests a patient response to the event through a push notification or the like to the RC 16, C18, or other device. In at least some embodiments, a lack of response escalates the event by, for example, sending an alert or other message to an approved care giver, physician, or emergency contact or service. In at least some embodiments, requesting a patient response may be skipped (or the time waiting for the patient response may be shortened) based on the potential severity of the event, or the significance or confidence in the occurrence of the event. Examples of events can include, but are not limited to, falls, heart disorders, absence of a heartbeat or cardiac signal, lack or absence of respiration, lack of motion, or the like.

In at least some embodiments, any of the assessments, measurements, or monitoring described above can be performed as a requested or task-based approach or on an automated (e.g., continuous or periodic) approach. In the requested or task-based approach, the assessment, measurement, or monitoring using the sensor 15 may be triggered by a user (e.g., the patient or caregiver) or by any other suitable external source and may be directed to a particular assessment, measurement or monitoring over a set duration of time or until a change in an event. In at least some embodiments, task-based assessment, measurement, or monitoring can assist in event identification and targeted data collection.

In at least some embodiments, automated assessment, measurement, or monitoring using the sensor 15 can assist in detection of events during daily life and can be particularly useful for assessing, measuring, or monitoring significant events such as, for example, falls, myocardial infarction, cardiac arrest, or respiratory arrest (or sleep apnea) or the like. In at least some embodiments, automated assessment, measurement, or monitoring using the sensor 15 can assist in treatment management so that the electrical stimulation system can change the electrical stimulation program during significant changes of activity such as sleep onset, waking, walking, exercising, driving, or the like.

In at least some embodiments, automated assessment, measurement, or monitoring is performed on the IPG 14 using the sensor 15. In at least some embodiments, modifications to the stimulation by the IPG 14 may occur without immediately informing a secondary device such as the RC 16 or CP 18. In at least some embodiments, providing a warning or other information to a connected device can result in the IPG 14 connecting to the RC 16, CP 18, or other device. In at least some embodiments, the IPG 14 may be configured to boost power to communication to increase the range of the signal from the IPG 14 depending on the urgency or seriousness of a measured or monitored event. In at least some embodiments, this may be at the expense of the battery life and may involve changing the communication advertising interval as well.

In at least some embodiments, assessments or processing of the measurements from the sensor 15 may be performed on an external device, such as the RC 16, CP 18, other computer, or in the cloud to reduce power consumption of the IPG 14. In at least some embodiments, assessments or processing for automated measurement or monitoring using the sensor 15 may be performed on the IPG 14 to avoid any delay in identification of significant events.

Described herein are methods and systems for measuring a variety of symptoms and conditions using a sensor, such as an accelerometer, disposed in, or on, an IPG. In at least some embodiments, assessing, monitoring, or measuring using the sensor can allow for relatively rapid reporting of life-threatening medical events to enable medical response. In at least some embodiments, assessing, monitoring, or measuring using the sensor can allow for recording of health data that can improve understanding of the patient's health and address ongoing or developing medical conditions proactively to reduce the chance of more serious medical events. In at least some embodiments, assessing, monitoring, or measuring using the sensor can allow for the IPG to act as an input trigger to record acute events, manage treatment changes with chronic events, and report serious medical events without having to process data initially through the RC. In at least some embodiments, assessing, monitoring, or measuring using the sensor can allow for the IPG to temporarily boost the communication signal to increase signal range in the event of a life-threatening medical event.

Figure 6:
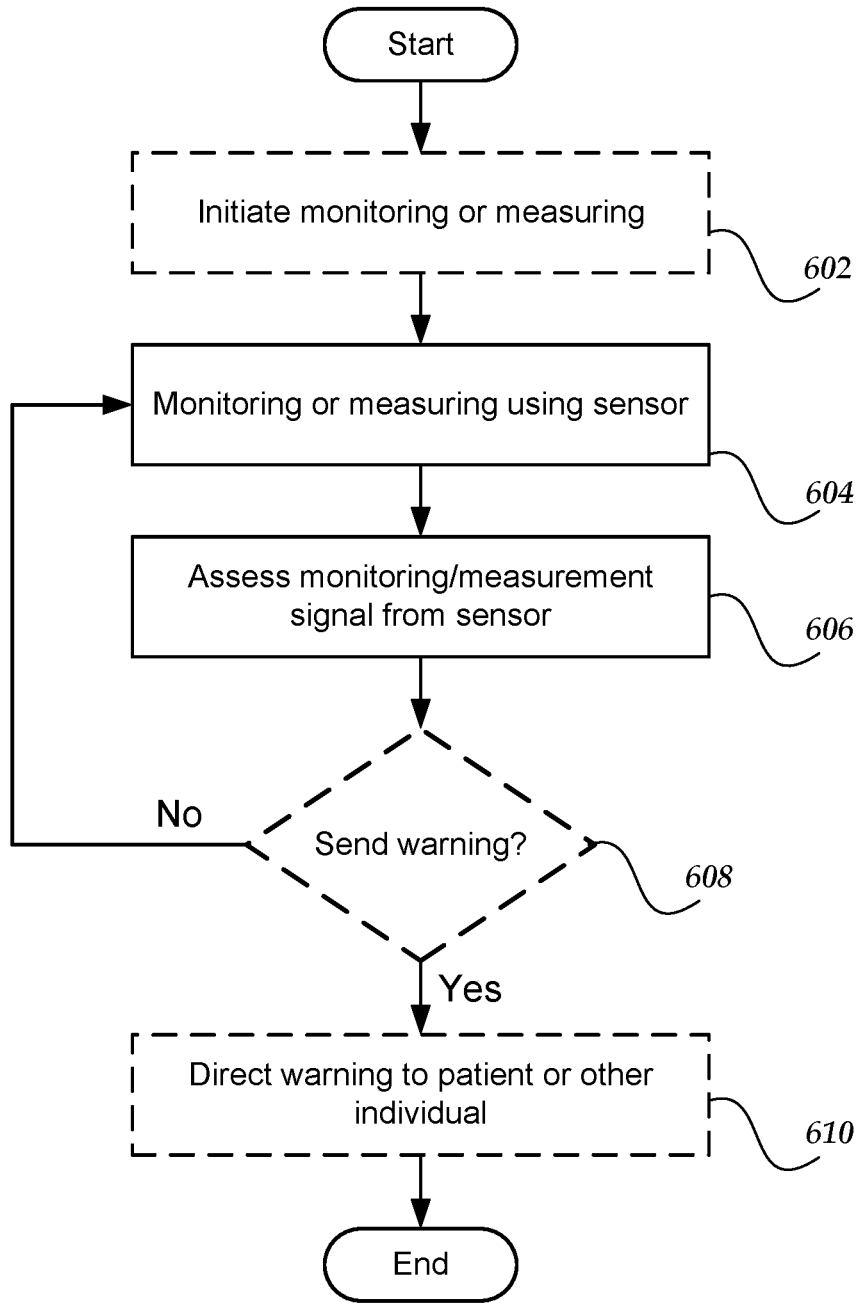
FIG. 6 is a flowchart of one embodiment of a method for monitoring, measuring, or assessing using an electrical stimulation system with a sensor.

FIG. 6 is a flowchart of one embodiment of a method for monitoring, measuring, or assessing using an electrical stimulation system with a sensor. In optional step 602, monitoring or measuring is initiated. In at least some embodiments, the monitoring or measuring is initiated by a user, such as a patient, caregiver, programmer, clinician, or any other suitable individual, or by the electrical stimulation system itself according to the system's programming. In at least some embodiments, the monitoring or measuring is continuous or periodic instead of being initiated by a user.

In step 604, the monitoring or measuring is performed using a sensor, such as sensor 15 of FIG. 1. Examples of monitoring and measuring different patient activities and bodily functions are presented above.

In step 606, a signal from the sensor arising from the monitoring or measuring is assessed. Examples of assessments of monitoring or measurements are presented above. In at least some embodiments, the processor of an implantable control module, such as IPG 14, performs (or partially performs) the assessment. In at least some embodiments, another device, such as RC 16, CP 18, or any other suitable device, performs (or partially performs) the assessment.

In optional step 608, the processor of IPG 14 or other device may determine whether to send a warning based on the assessment. Examples of such determinations are presented above. In at least some embodiments, whether step 608 is performed or not, the process returns to step 604 until the monitoring or measuring is completed.

If a warning is to be sent, in optional step 610, the warning is directed to the patient or to another device or individual. Examples of directing a warning and considerations for where the warning is directed are described above.

It will be understood that each block of the flowcharts, and combinations of blocks in the flowcharts and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computing device. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

The above specification and examples provide a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. An electrical stimulation system, comprising:
   a lead comprising a plurality of electrodes disposed along a distal portion of the lead; and
   an implantable control module configured for implantation in a patient and coupled, or coupleable, to the lead, the implantable control module comprising
      an accelerometer, and
      a processor coupled to the accelerometer and configured for
         directing electrical stimulation through the electrodes of the lead,
         detecting, by the accelerometer, a plurality of taps of a body region of a patient over an implantation site of the implantable control module,
         identifying, by the processor of the implantable control module, an indicator, trigger, or marker based on the detected tapping,
         performing an activity corresponding to the identified indicator, trigger, or marker,
         monitoring, by the accelerometer, movements of a hand positioned over an implantation site of the implantable control module, and
         assessing, by the processor of the implantable control module, tremor or bradykinesia based on the monitored movements.

2. The electrical stimulation system of claim 1, wherein identifying the indicator, trigger, or marker comprises identifying the indicator, trigger, or marker based on the number of taps detected.

3. The electrical stimulation system of claim 1, wherein performing the activity comprises storing an indication that the patient has taken medication in response to the detected taps.

4. The electrical stimulation system of claim 1, wherein performing the activity comprises initiating an assessment in response to the detected taps.

5. The electrical stimulation system of claim 1, wherein performing the activity comprises at least one of the following: increasing or decreasing a stimulation amplitude, marking an event, starting a recording, starting a therapy, or rating a therapy.

6. The electrical stimulation system of claim 1, wherein the processor is further configured for assessing whether the patient has fallen.

7. The electrical stimulation system of claim 1, wherein the processor is further configured for assessing a cardiac signal of the patient.

8. The electrical stimulation system of claim 1, wherein the processor is further configured for assessing respiration of the patient.

9. The electrical stimulation system of claim 1, wherein the processor is further configured for assessing snoring or sleep apnea of the patient.

10. The electrical stimulation system of claim 1, wherein the processor is further configured for assessing swallowing by the patient.

11. A method for operation of the electrical stimulation system of claim 1, the method comprising:
   directing electrical stimulation through the electrodes of the lead;
   monitoring movements of the hand positioned over the implantation site of the implantable control module using the accelerometer coupled to the processor of the implantable control module; and
   assessing, by the processor of the implantable control module, tremor or bradykinesia based on the monitored movements.

12. The method of claim 11, further comprising assessing whether the patient adopts a hunched posture.

13. The method of claim 11, further comprising assessing whether speech by the patient is slow.

14. The method of claim 11, further comprising assessing a volume of speech by the patient.

15. The method of claim 11, further comprising assessing whether the patient has fallen.

16. The method of claim 11, further comprising assessing a cardiac signal of the patient.

17. The method of claim 11, further comprising assessing respiration of the patient.

18. The method of claim 11, further comprising assessing snoring or sleep apnea of the patient.

19. The method of claim 11, further comprising assessing swallowing by the patient.

20. The method of claim 11, further comprising communicating a warning to an external device based on monitoring or measuring performed using the accelerometer.

* * * * *